United States Patent
Teoh

(10) Patent No.: US 9,746,205 B2
(45) Date of Patent: Aug. 29, 2017

(54) DOUBLE LAYER SOLAR HEATING-AND-COOLING THERMOSYPHON SYSTEM

(71) Applicant: Siang Teik Teoh, Selangor (MY)

(72) Inventor: Siang Teik Teoh, Selangor (MY)

(73) Assignee: Elaine P. Teoh, San Francisco, CA (US)

( * ) Notice: Subject to any disclaimer, the term of this patent is extended or adjusted under 35 U.S.C. 154(b) by 635 days.

(21) Appl. No.: 14/350,072

(22) PCT Filed: Oct. 29, 2012

(86) PCT No.: PCT/US2012/062456
§ 371 (c)(1),
(2) Date: Apr. 6, 2014

(87) PCT Pub. No.: WO2013/063590
PCT Pub. Date: May 2, 2013

(65) Prior Publication Data
US 2014/0260002 A1    Sep. 18, 2014

Related U.S. Application Data

(60) Provisional application No. 61/628,344, filed on Oct. 27, 2011, provisional application No. 61/629,445, (Continued)

(51) Int. Cl.
*F24J 2/44* (2006.01)
*E04D 13/00* (2006.01)
(Continued)

(52) U.S. Cl.
CPC .............. *F24J 2/44* (2013.01); *E04D 13/00* (2013.01); *F24D 11/003* (2013.01);
(Continued)

(58) Field of Classification Search
CPC ...... F24J 2/44; F24J 2/26; F24J 2/0023; F24J 2/4647; F24J 2/345; E04D 13/00;
(Continued)

(56) References Cited

U.S. PATENT DOCUMENTS

| 4,227,515 A * | 10/1980 | Jacob | ................... F24D 11/003 |
| | | | 126/592 |
| 6,014,968 A * | 1/2000 | Teoh | ....................... F24J 2/265 |
| | | | 126/639 |
| 2011/0253126 A1* | 10/2011 | Yin | ......................... F01K 25/08 |
| | | | 126/622 |

* cited by examiner

*Primary Examiner* — Alfred Basichas
(74) *Attorney, Agent, or Firm* — Donald E. Schreiber

(57) ABSTRACT

A solar liquid-heating-and-cooling system (20) includes:
1. a hot-liquid storage-tank (22);
2. a hot-liquid manifold-tank (26);
3. a coaxial heating-and-cooling-tube (24) that connects downward from the hot-liquid storage-tank (22) to the hot-liquid manifold-tank (26);
4. a double layer heating-and-cooling collector-array-panel (32) located beneath the hot-liquid manifold-tank (26), the panel (32) including, connected to the hot-liquid manifold-tank (26):
 a. an upper layer of glazed heating-tubes (36); and
 b. a lower layer of unglazed cooling-tubes (56);
5. parabolic-trough mirror reflectors (64) that are located between the upper and lower layers of tubes (36, 56);
6. cold-liquid manifold-tank (92) located below the panel (32) connected to lower ends both of the glazed heating-tubes (36) and of the unglazed cooling-tubes (56);
7. a cold liquid storage tank (98); and
8. a coaxial heating-and-cooling-tube (96) that connects downward from the cold-liquid manifold-tank (92) to the cold liquid storage tank (98).

29 Claims, 19 Drawing Sheets

Related U.S. Application Data filed on Nov. 21, 2011, provisional application No. 61/617,556, filed on Mar. 29, 2012.

(51) Int. Cl.
*F24J 2/26* (2006.01)
*F24J 2/34* (2006.01)
*F25D 1/00* (2006.01)
*F24J 2/00* (2014.01)
*F24J 2/46* (2006.01)
*F28D 5/00* (2006.01)
*F24D 11/00* (2006.01)
*F24F 5/00* (2006.01)

(52) U.S. Cl.
CPC ............... *F24J 2/0023* (2013.01); *F24J 2/26* (2013.01); *F24J 2/345* (2013.01); *F24J 2/4647* (2013.01); *F25D 1/00* (2013.01); *F28D 5/00* (2013.01); *F24F 2005/0064* (2013.01); *Y02B 10/20* (2013.01); *Y02E 10/44* (2013.01)

(58) Field of Classification Search
CPC . F25D 1/00; F28D 5/00; F24D 11/003; Y02E 10/44; Y02B 10/20; F24F 2005/0064
See application file for complete search history.

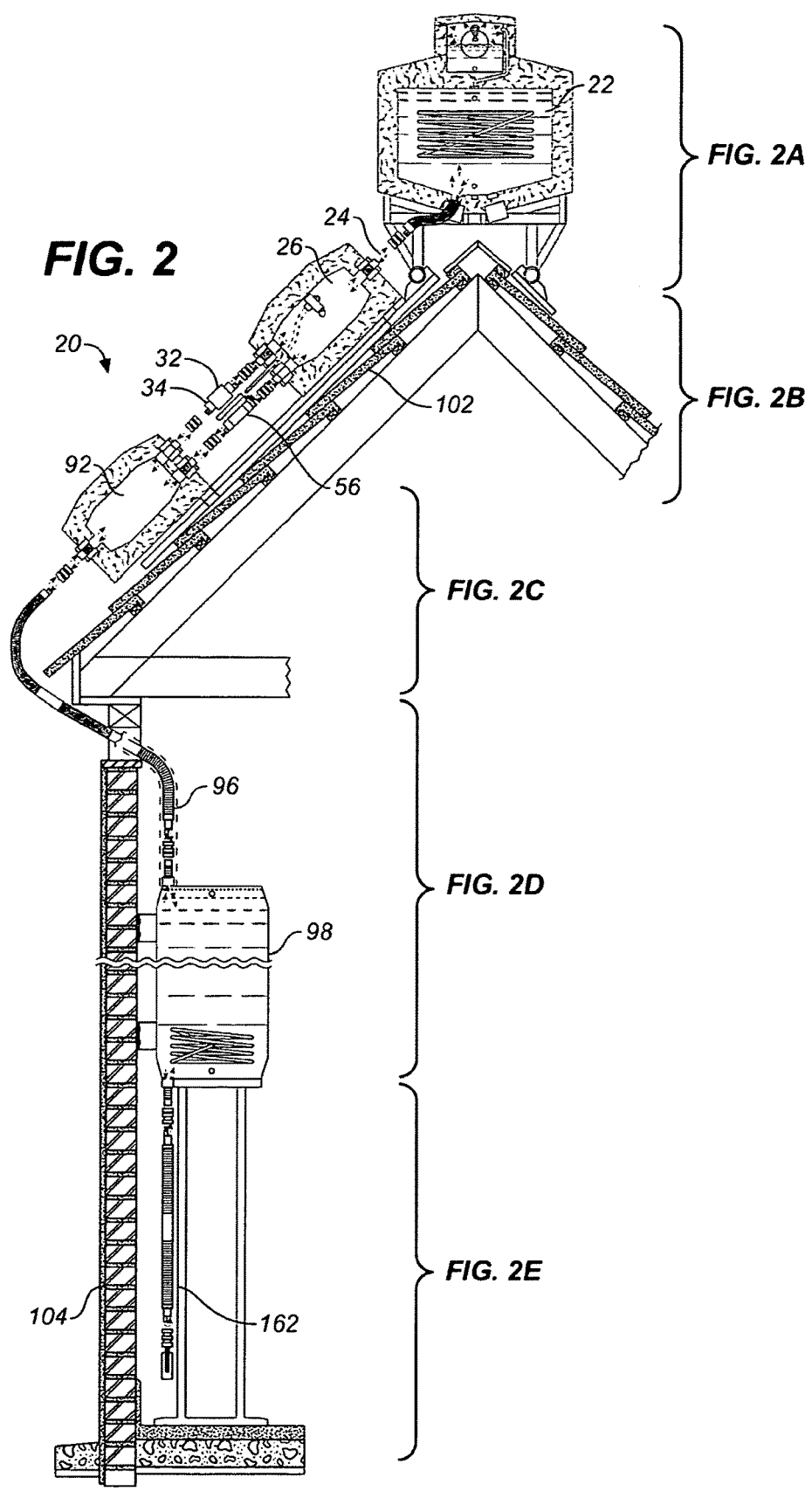

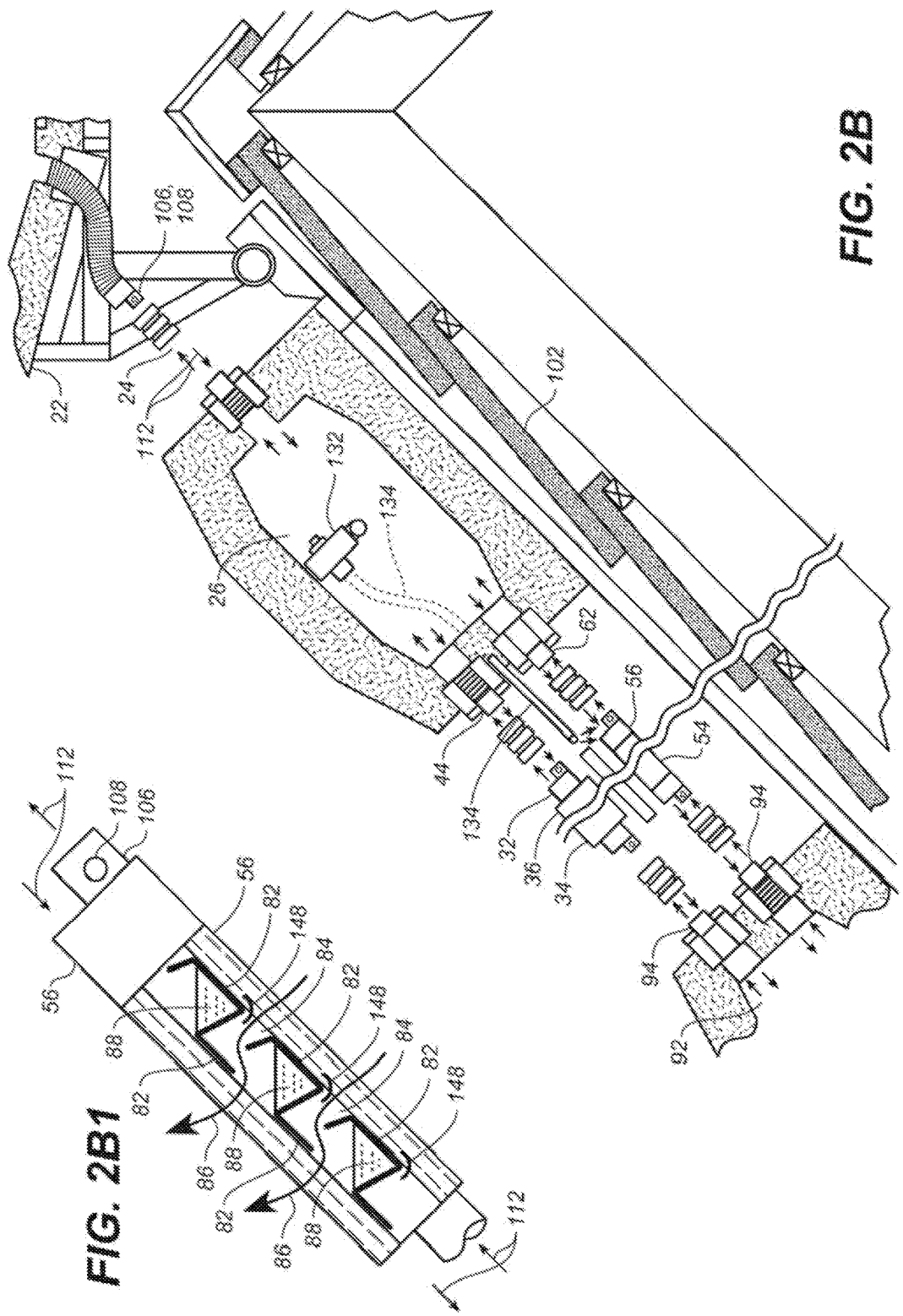

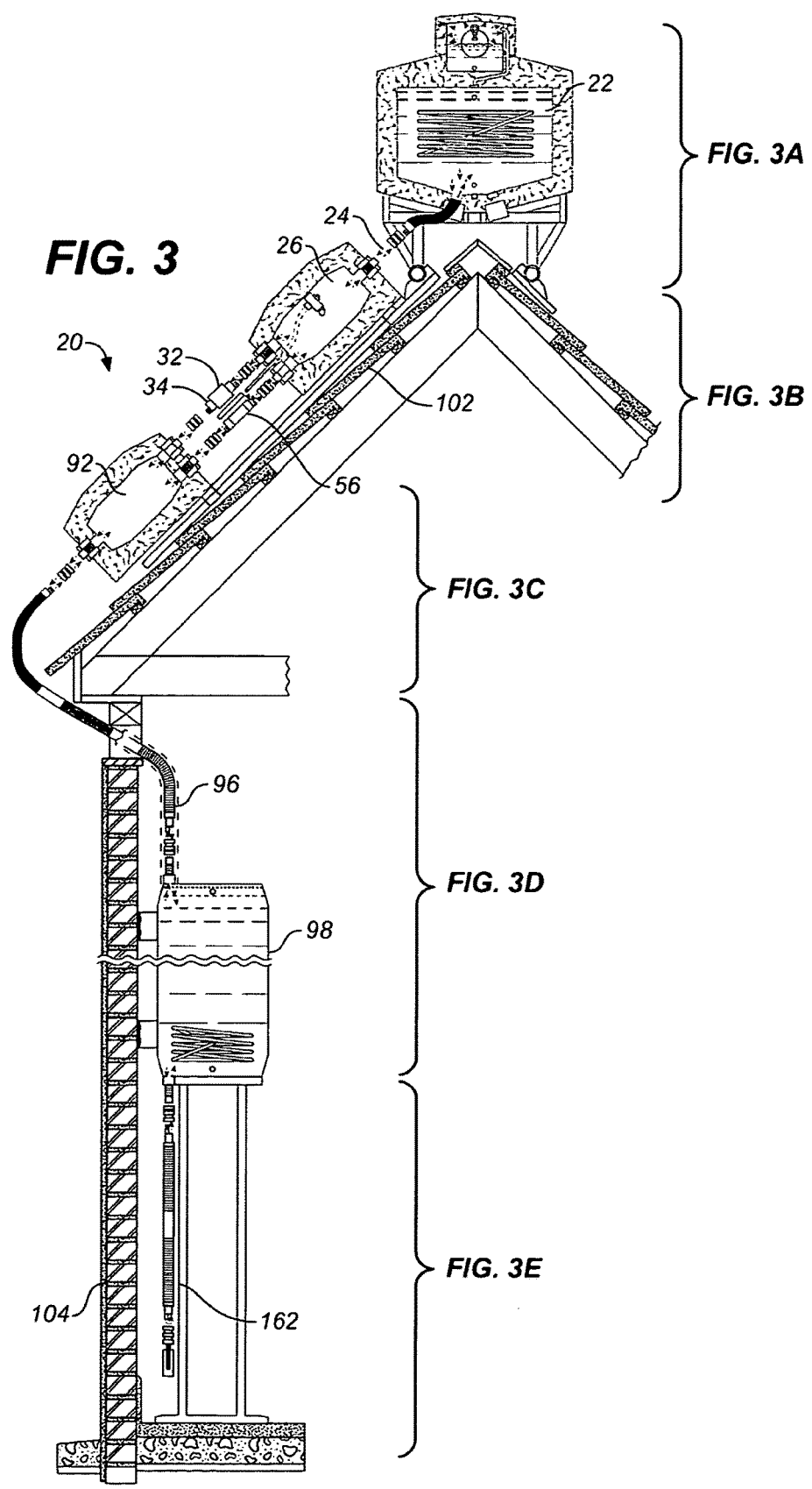

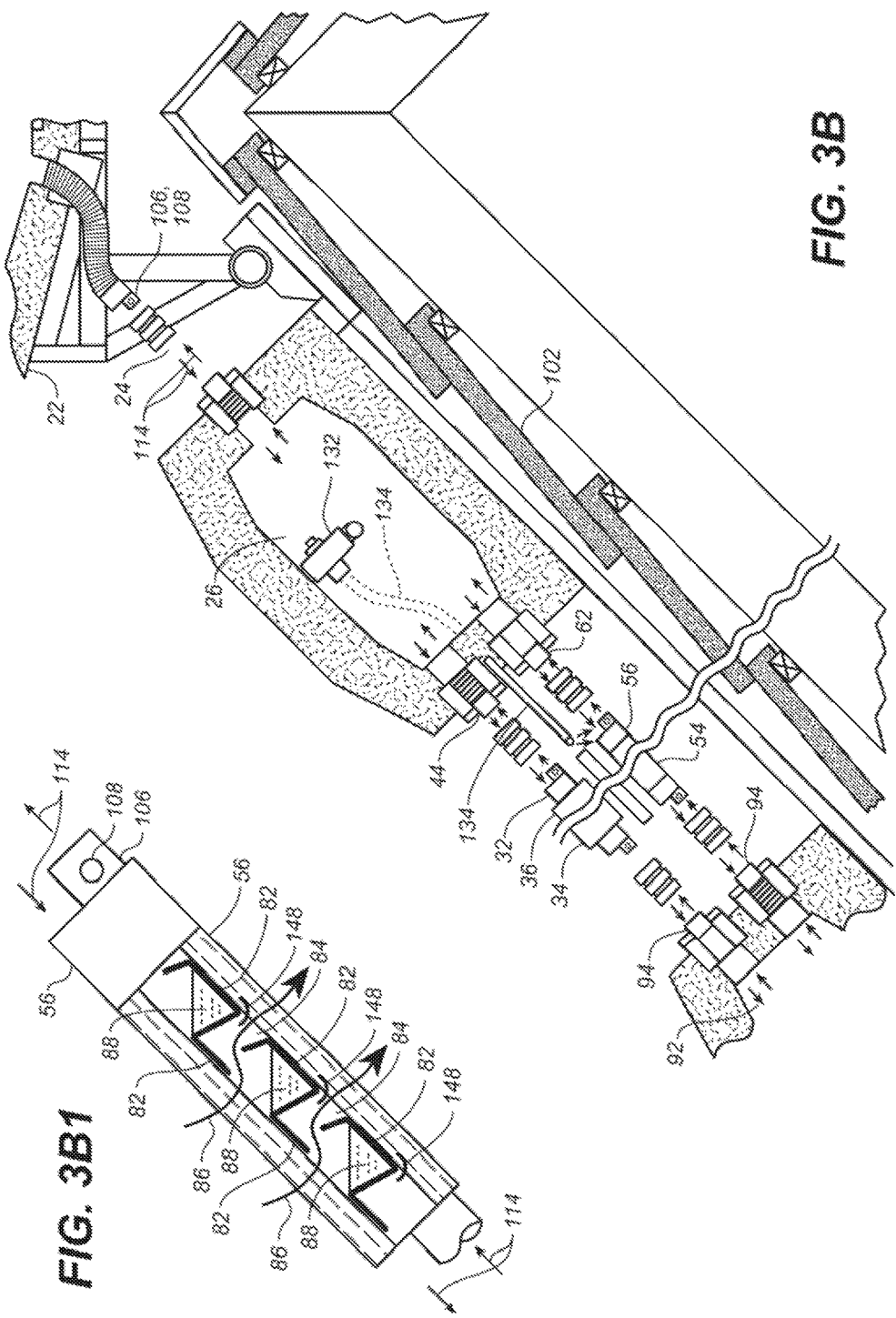

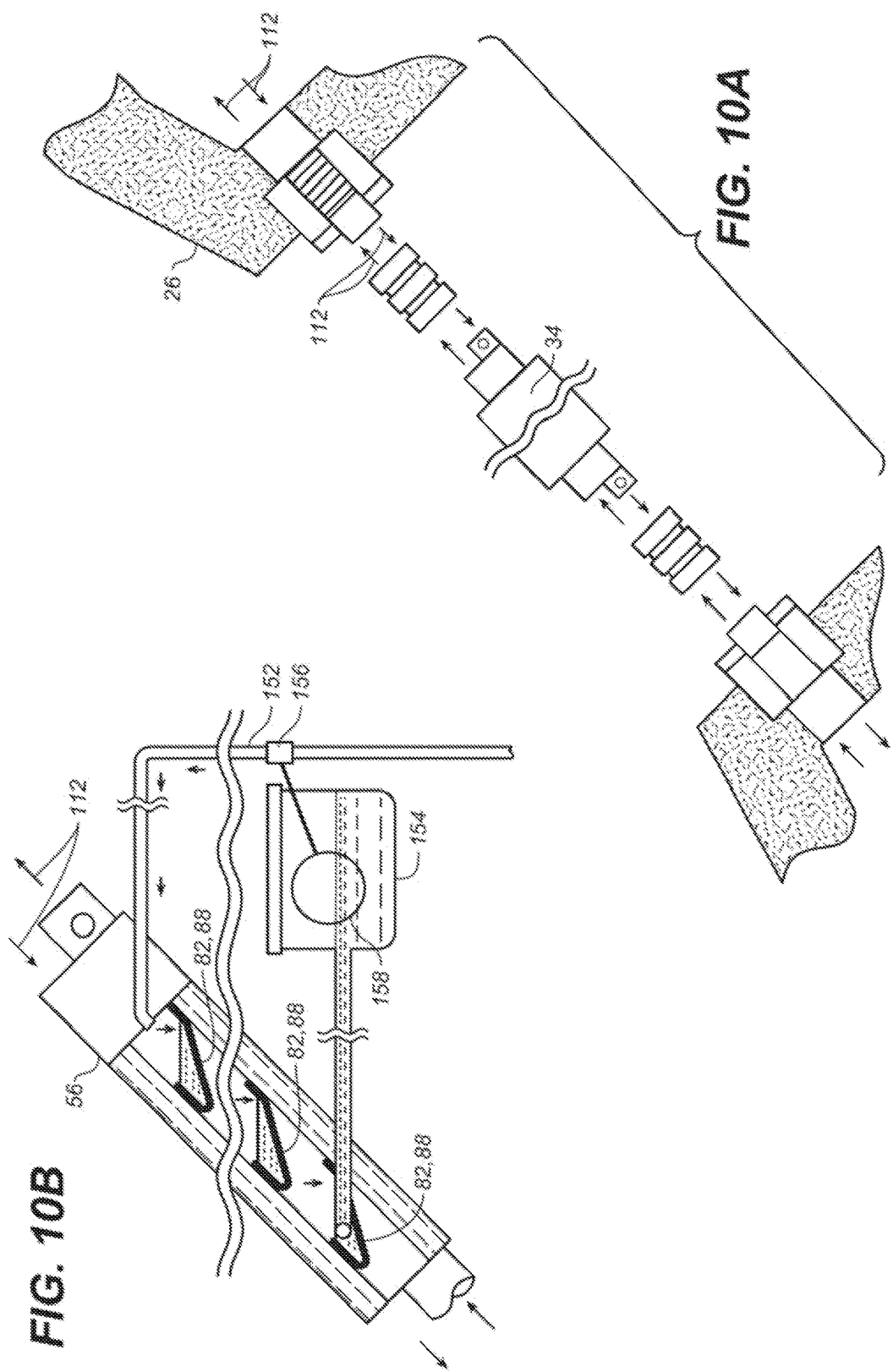

DOUBLE LAYER SOLAR HEATING-AND-COOLING THERMOSYPHON SYSTEM

TECHNICAL FIELD

This disclosure relates generally to solar water-heating-systems, and more specifically to such a system that includes a dual layer coaxial tube heating-and-cooling collector-array-panel.

BACKGROUND ART

All thermosyphon solar heating collector panels and radiative or evaporative cooling panels absorb thermal energy from the sun or coolness from the surrounding environment. Absorbing thermal energy from the sun or coolness from the surrounding environment establish a thermosyphon convection current flow in the panel's heating and/or cooling tubes that usually moves the heated or cooled fluid respectively into one or more storage tanks. Some of this energy exchange between the panel's heating and/or cooling tubes and the surrounding environment either heats or cools fluid in the panel's tubes. However, a significant portion of energy from this exchange is transferred into kinetic energy of the thermosyphonic flows induced in the fluid inside the panel's heating and/or cooling tubes.

U.S. Pat. No. 6,014,968 entitled "Tubular Heating-Pipe Solar Water-Heating-System With Integral Tank" that issued Jan. 18, 2000, on a patent application filed in the name of Siang Teik Teoh ("the '968 patent") discloses a solar water-heating system having collector core that includes a plurality of hollow heating-pipes. Each heating-pipe has a longitudinal axis and an interior that is surrounded by an outer wall. When assembled into the collector core of the solar water-heating system, the heating-pipes are aligned substantially parallel to each other, and in use are adapted to be inclined to the horizontal. Thus, when in use each of the heating-pipes has an open upper end that is elevated above the heating-pipe's closed lower end. The open upper end of the heating-pipes disclosed in the '968 patent extend directly to, open into, and communicate directly with:
 1. a lower level of a hot-water storage-tank; or
 2. a lower portion of another the solar water-heating-panel.

Each of the hollow heating-pipes has an outer wall that surrounds a hollow cooler-water return-pipe. The cooler-water return-pipe within each of the heating-pipes has an internal cross-sectional area that is approximately equal to one-third (⅓) to one-half (½) of an internal cross-sectional area enclosed by the surrounding heating-pipe's outer wall. The cooler-water return-pipe within each of the heating-pipes also has a length that is slightly longer than a length of the outer wall of the heating-pipe. Thus, the open upper end of the cooler-water return-pipe extends beyond the open upper end of the heating-pipe's outer wall. In this way the upper end of the cooler-water return-pipe extends into and communicates directly with:
 1. the lower level of a hot-water storage-tank; or
 2. the lower portion of another the solar water-heating-panel.
A lower end of each cooler-water return-pipe is perforated so fluid may flow outward from within the lower end of each cooler-water return-pipe toward the surrounding outer wall of the heating-pipe.

Preferably, the solar water-heating system disclosed in the '968 patent includes a transparent cover, usually made of glass, that is disposed immediately adjacent to and shields the heating-pipes. The solar water-heating system disclosed in the '968 patent when assembled with evacuated glass thermosyphon coaxial heating tubes exhibits the highest thermal efficiencies of all presently known solar water-heating systems.

Similarly, U.S. Pat. No. 7,398,779 entitled "Thermosiphoning System With Side Mounted Storage Tanks" ("the '779 patent") also discloses a single layer collector panel. However, the collector panel disclosed in the '779 patent dissipates kinetic energy (momentum) present in fluid rising and/or falling through the panel's tubes when the rising and/or falling flows meets an upper or lower header manifold tank which stops the rising or falling flow.

Patent Cooperation Treaty ("PCT") International Patent Application no. 2010/003046 that was published 26 May 2011, as International Publication no. WO 2011/062649 for a patent application filed in the name of Siang Teik Tech, et al. entitled "Coaxial Tube Solar Heater With Nighttime Cooling" ("the PCT Patent Application") discloses a solar heating-and-cooling system that includes a collector array panel having a single layer of coaxial thermosyphon heating/cooling-tubes. In one embodiment, each of the thermosyphon heating/cooling-tubes included in the collector-array-panel connects:
 1. at an upper end to an upper manifold; and
 2. at a lower end to an intermediate manifold.
A heated-liquid coaxial tube connects the upper manifold upward to a hot-water storage-tank, and a cool-liquid coaxial tube connects the intermediate manifold downward to a cold-water storage-tank. The heated-liquid cool-liquid coaxial tube and the cool-liquid coaxial tube respectively carry hot and cold water between the collector-array-panel and the hot water and cold water storage tanks.

In general, single layer solar water-heating system such as that disclosed in the '968 and '779 Patents and a single layer solar heating-and-cooling system such as that disclosed in the PCT Patent Application exhibit stagnation. That is, the thermosyphonic flow stops during marginal solar radiation conditions such as at sunrise or sunset. Consequently, there exists a need for a solar heating and/or cooling system which betters thermosyphonic flow during marginal solar conditions.

DISCLOSURE

An object of the present disclosure is to provide an improved thermosyphon solar liquid-heating-and-cooling system.

Another object of the present disclosure is to provide a more efficient thermosyphon solar liquid-heating-and-cooling system.

Another object of the present disclosure is to provide a thermosyphon solar liquid-heating-and-cooling system that exhibits improved performance when marginal solar radiation occurs.

Disclosed herein is a solar liquid-heating-and-cooling system that includes a hot-liquid storage-tank that connects via at least one coaxial heating-and-cooling-tube to a hot-liquid manifold-tank located below the hot-liquid storage-tank. The solar liquid-heating-and-cooling system also includes at least one double layer passive thermosyphon solar heating-and-cooling collector-array-panel. The collector-array-panel includes:
 1. an upper layer of glazed heating-tubes each of which has a solar selective absorptive surface and an upper end that connects directly to and communicates directly with the hot-liquid manifold-tank;
2. a lower layer of unglazed cooling-tubes each of which has a heat radiating surface and an upper end that connects directly to and communicates directly with the hot-liquid manifold-tank; and
3. preferably parabolic-trough mirror reflectors that are located between the upper layer of glazed heating-tubes and the lower layer of unglazed cooling-tubes.

Each tube of the lower layer of unglazed cooling-tubes is preferably located beneath a tube included in the upper layer of glazed heating-tubes when the heating-and-cooling collector-array-panel is inclined at an angle facing the sun. Each parabolic-trough mirror reflector includes interior edges that forms a venturi like opening that is preferably located beneath one of the glazed heating-tubes. Each venturi like opening is also preferably located over one of the unglazed cooling-tubes with the parabolic-trough mirror reflectors shading the unglazed cooling-tubes located beneath the venturi like opening. The solar liquid-heating-and-cooling system also includes a cold-liquid manifold-tank that is located below the collector-array-panel and that connects directly to and communicates directly with lower ends both of the glazed heating-tubes and of the unglazed cooling-tubes. At least one coaxial heating-and-cooling-tube connects directly to and communicates between the cold-liquid manifold-tank and a cold liquid storage tank that is located below the cold-liquid manifold-tank. During day or night rising or sinking air flowing past the heated or cooled parabolic-trough mirror reflectors and the glazed heating-tubes accelerates through the venturi like openings for blowing around the unglazed cooling-tubes thereby bettering cooling thereof.

An advantage of the disclosed thermosyphon solar liquid-heating-and-cooling system is that its configuration exhibits improved performance at sunrise, sunset or in other marginal solar radiation conditions by advantageously exploiting kinetic energy in the solar liquid-heating-and-cooling system's thermosyphon flow.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 2 is a diagram illustrating arrangement of FIGS. 2A through 2E into a cross-sectional elevational view of the entire solar system depicted in FIG. 1 during daytime while heating liquid.

FIGS. 2B and 2C when combined form a cross-sectional elevational view depicting the solar system's heating-and-cooling collector-array-panel, and the system's upper and lower manifold tanks depicted in FIG. 1 during daytime while heating liquid that illustrates glazed heating-tubes and parabolic-trough mirror reflectors that are located above the heating-and-cooling collector-array-panel's unglazed cooling-tubes, both of which sets of tubes connect to the solar system's upper and lower manifold tanks, and adjustable pressure relief expansion valves having an expansion spray tube for spraying cooling liquid both onto the unglazed cooling-tubes, and onto cooling fins extending therefrom.

FIG. 2B1 is a cross-sectional elevational view depicting in greater detail the unglazed cooling-tubes depicted in FIGS. 2B and 2C together with cooling fins extending therefrom.

FIG. 3 is a diagram illustrating arrangement of FIGS. 3A through 3E into a cross-sectional elevational view of the entire solar system depicted in FIG. 1 during nighttime while cooling liquid.

FIGS. 3B and 3C when combined form a cross-sectional elevational view depicting the solar system's heating-and-cooling collector-array-panel, upper and lower manifold tanks depicted in FIG. 1 and the combined FIGS. 2B and 2C during nighttime while cooling liquid.

FIG. 3B1 is a cross-sectional elevational view depicting in greater detail the unglazed cooling-tubes depicted in FIGS. 3B and 3C together with cooling fins extending therefrom.

Figure 1:
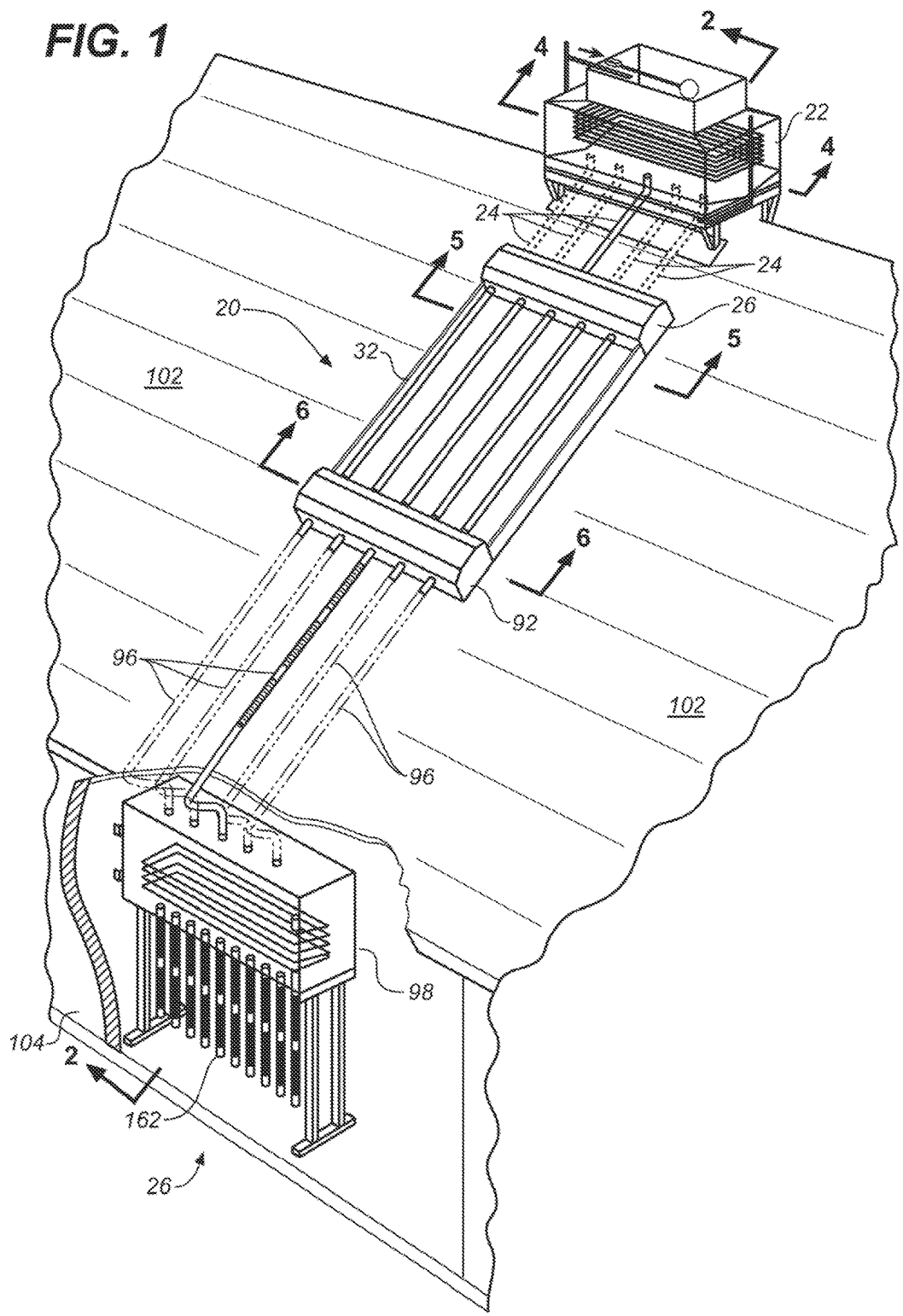
FIG. 1, a partially cut away perspective view of a solar liquid-heating-and-cooling system in accordance with the present disclosure that provides both heating and cooling, depicts the overall positions of:
a. a hot-liquid storage-tank on a building's roof ridge;
b. a solar heating-and-cooling collector-array-panel together with:
 i. upper hot-liquid manifold-tank located on the building's roof beneath the hot-liquid storage-tank and above the heating-and-cooling collector-array-panel; and
 ii. lower cold-liquid manifold-tank located on the building's roof beneath the heating-and-cooling collector-array-panel;
c. a cold liquid storage tank located below the lower manifold tank and preferably inside the building; and
d. a cooling radiator together with a support frame therefor that are located inside the building below the cold liquid storage tank with the cooling radiator being connected to the cold liquid storage tank for exchanging liquid therebetween.

1. two (2) concatenated solar heating-and-cooling collector-array-panels of the type depicted in FIG. 1; and
2. an intermediate manifold tank located between the concatenated solar heating-and-cooling collector-array-panels, the intermediate manifold tank being similar to the upper hot liquid and lower cold-liquid manifold-tanks depicted in FIG. 1.

Figure 8:
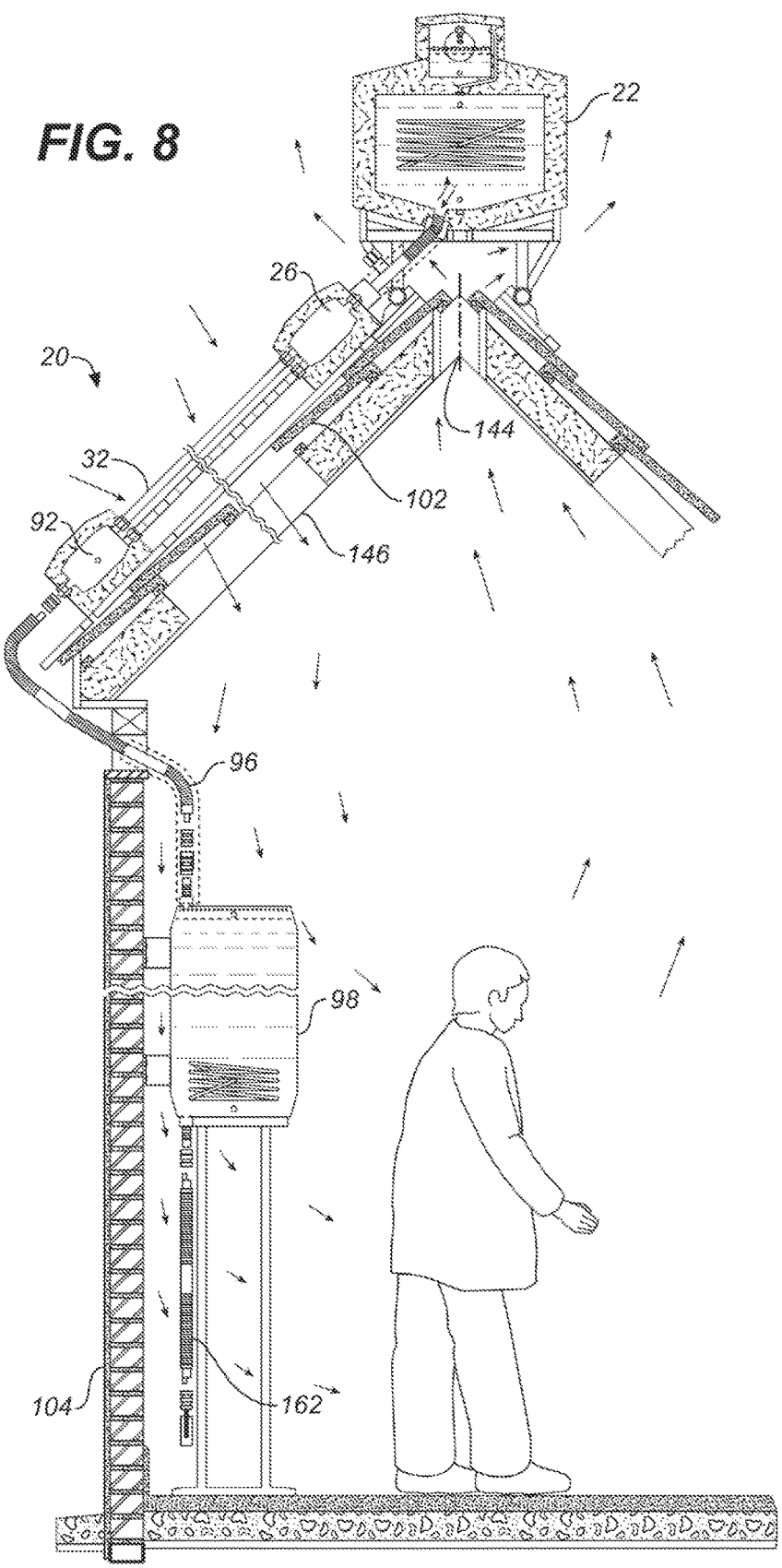

FIG. 8 is a cross-sectional elevational view depicting an installed solar liquid-heating-and-cooling system of FIG. 1 which installation adapts the system for advantageously exploiting the system's cooling capacity.

Figure 9:
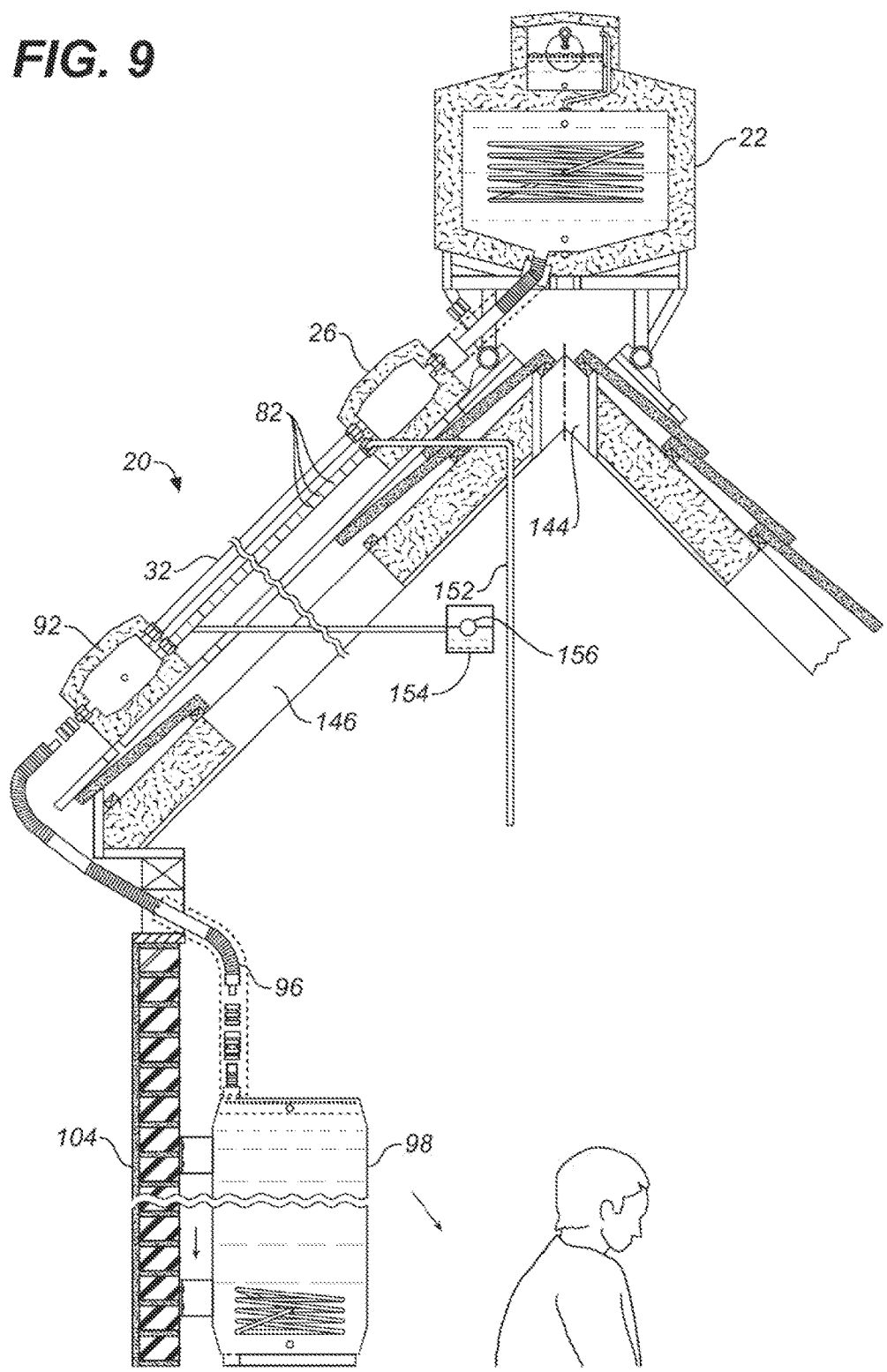

FIG. 9 is a partial cross-sectional elevational view depicting a solar liquid-heating-and-cooling system similar to that depicted in FIG. 8 particularly adapted for use in hot climates by inclusion of an optional auxiliary refilling system fitted to the cooling fins depicted in FIGS. 2B, 2B1 and 2C and 3B, 31 and 3C for ensuring that cooling fin troughs remain full of liquid.

FIG. 10A is an enlarged cross-sectional elevational view depicting the unglazed cooling-tubes depicted in FIGS. 2B, 2B1 and 2C and 3B, 381 and 3C and 9 from which cooling fins extend.

FIG. 10B is an enlarged cross-sectional elevational view depicting in greater detail the optional auxiliary cooling fin refilling system illustrated in FIG. 9.

BEST MODE FOR CARRYING OUT THE DISCLOSURE

FIGS. 1 through 6 depict a solar liquid-heating-and-cooling system in accordance with the present disclosure identified by the general reference character 20. The solar liquid-heating-and-cooling system 20 includes an insulated hot-liquid storage-tank 22 that connect via one or more coaxial heating-and-cooling tubes 24 with an insulated hot-liquid manifold-tank 26 that is located below the hot-liquid storage-tank 22. Except as specifically described herein and/or depicted in the FIGs., the hot-liquid storage-tank 22 is similar to the hot-water storage-tank 38 described and depicted in United States Patent Application Publication no. 2012/0227730 published Sep. 13, 2012, that is hereby incorporated by reference as though fully set forth here.

A double layer passive thermosyphon solar heating-and-cooling collector-array-panel 32 is located below the hot-liquid manifold-tank 26. The heating-and-cooling collector-array-panel 32 includes an upper layer of glazed heating-tubes 34. Each glazed heating-tube 36 included in the upper layer of glazed heating-tubes 34 has a solar selective absorptive surface 42 and an upper end 44 that connects directly to and communicates directly with the hot-liquid manifold-tank 26. The heating-and-cooling collector-array-panel 32 also includes a lower layer of unglazed cooling-tubes 54. Each unglazed cooling-tube 56 included in the lower layer of unglazed cooling-tubes 54 has a heat radiating surface 58 and an upper end 62 that connects directly to and communicates directly with the hot-liquid manifold-tank 26. The unglazed cooling-tubes 56 are preferably located beneath the upper layer of glazed heating-tubes 34 when the heating-and-cooling collector-array-panel 32 is inclined at an angle facing the sun. Preferably, each unglazed cooling-tube 56 is located beneath one of the glazed heating-tubes 36.

Figure 5:
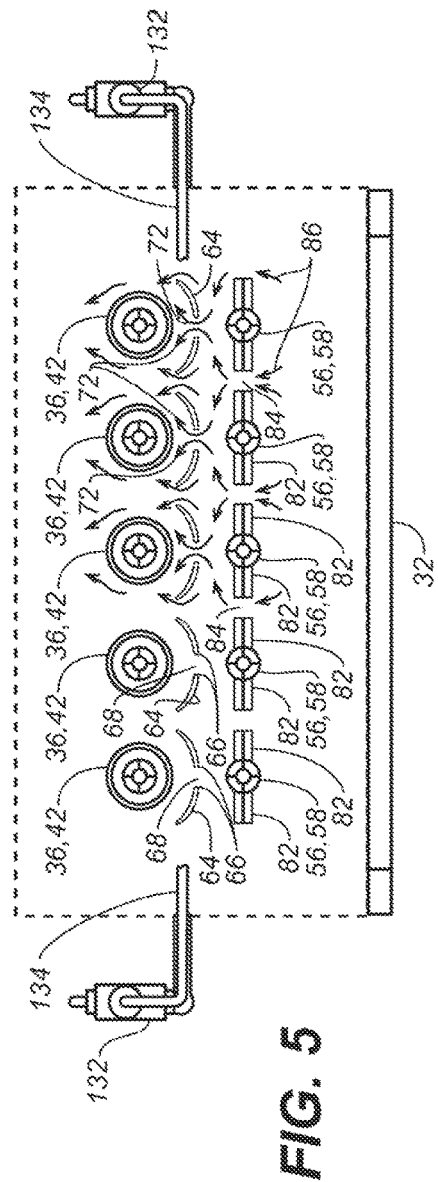
FIG. 5 is a cross-sectional view of the heating-and-cooling collector-array-panel depicted in FIG. 1, in the combined FIGS. 2B and 2C, and in the combined FIGS. 3B and 3C that is taken along the line 5-5 in FIG. 1.
Figure 6:
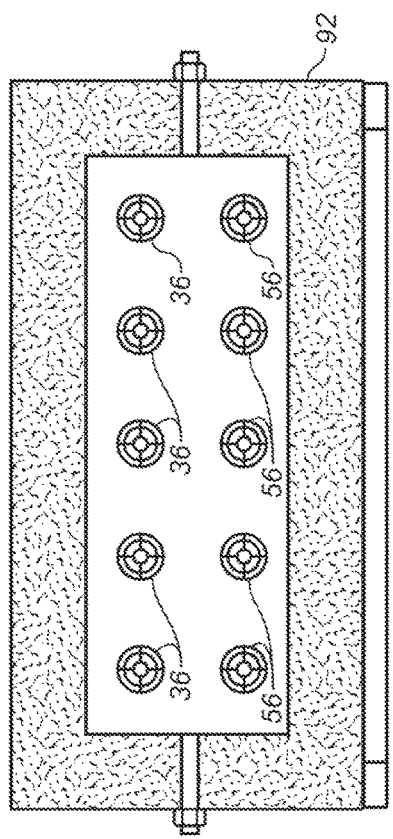
FIG. 6 is a cross-sectional view of the lower manifold tank depicted in FIGS. 1, 2D and 3D, in the combined FIGS. 2B and 2C, and in the combined FIGS. 3B and 3C that is taken along the line 6-6 in FIG. 1.

As best illustrated in FIG. 5, the heating-and-cooling collector-array-panel 32 also includes parabolic-trough mirror reflectors 64 that are located between the upper layer of glazed heating-tubes 34 and the unglazed cooling-tubes 56. The parabolic-trough mirror reflectors 64 are preferably hollow with a mirror reflector both on the upper and on the lower surfaces thereof. Constructed in this way, the lower surface of the hollow parabolic-trough mirror reflectors 64 do not get hot and do not radiate heat toward the lower layer of unglazed cooling-tubes 54 below. Interior edges 66 of each hollow parabolic-trough mirror reflector 64:

1. forms a venturi-like opening 68 that preferably is respectively located beneath one of the glazed heating-tubes 36; and
2. preferably each venturi-like opening 68 is also respectively located over one of the unglazed cooling-tubes 56 with one of the parabolic-trough mirror reflectors 64 shading each unglazed cooling-tubes 56 located beneath the venturi-like opening 68 therein.

During daytime, in a flow generally indicated by arrows 72 in FIG. 5, similar to a chimney air heated by the glazed heating-tubes 36 and parabolic-trough mirror reflectors 64 rises through the venturi-like openings 68 formed by adjacent interior edges 66 of the parabolic-trough mirror reflectors 64 and past the glazed heating-tubes 36. Passage through the venturi-like openings 68 between adjacent parabolic-trough mirror reflectors 64 accelerates the rising air flow. An analogous airflow in the opposite direction occurs during nighttime. Both the daytime and nighttime airflows through the venturi-like openings 68 provided by the parabolic-trough mirror reflectors 64 advantageously increase both:

1. direct cooling of unglazed cooling-tubes 56; and
2. additional evaporative cooling that is described in greater detail below.

In a preferred embodiment of the heating-and-cooling collector-array-panel 32 each unglazed cooling-tube 56 includes thermally-connected cooling fins 82. The cooling fins 82:

1. establish slots 84 through which air can flow indicated by arrows 86 in enlarged sections in FIGS. 2B and 3B; and
2. are configured to form a trough 88 for receiving and holding liquid when the heating-and-cooling collector-array-panel 32 is inclined at an angle.

The solar liquid-heating-and-cooling system 20 also includes an insulated cold-liquid manifold-tank 92 located beneath the heating-and-cooling collector-array-panel 32 that connects directly to and communicates directly with lower ends 94 both of glazed heating-tubes 36 and unglazed cooling-tubes 56. One or more coaxial heating-and-cooling tubes 96 connect directly to and communicate between the cold-liquid manifold-tank 92 and a cold-liquid storage-tank 98 that is located below the cold-liquid manifold-tank 92.

The configuration of the solar liquid-heating-and-cooling system 20 depicted in FIGS. 1, 2, 3, 7 and 8 permits locating the heating-and-cooling collector-array-panel 32 on the roof 102 of a building 104 with the hot-liquid storage-tank 22 located above a peak of the roof 102, or alternatively located above the hot-liquid manifold-tank 26 beneath the roof 102. As also depicted in those FIGs., the configuration of the solar liquid-heating-and-cooling system 20 permits locating the cold-liquid storage-tank 98 below the cold-liquid manifold-tank 92 inside the building 104.

Each of the coaxial heating-and-cooling tubes 24, 96 includes an inner tube 106. The inner tube 106 of coaxial heating-and-cooling tubes 24, 96 respectively interconnecting:

1. the hot-liquid storage-tank 22 with the hot-liquid manifold-tank 26; and
2. the cold-liquid manifold-tank 92 with the cold-liquid storage-tank 98, include perforations 108 at ends of each inner tube 106 where the coaxial heating-and-cooling tubes 24, 96 pass from a heating environment to a cooling environment and conversely. The perforations 108 promote formation of a transition zone inside the coaxial heating-and-cooling tubes 24, 96 where annular flow outside inner return tubes 106 enters thereinto and conversely. In addition to points at which the coaxial heating-and-cooling tubes 24, 96 enter the hot-liquid storage-tank 22, the hot-liquid manifold-tank 26, the cold-liquid manifold-tank 92 and the cold-liquid storage-tank 98, other places where there exists a tendency for such flow reversals to occur are where coaxial heating-and-cooling tubes 24, 96 pass through:

1. the outer wall of a building between the cold-liquid manifold-tank 92 and the cold-liquid storage-tank 98; and/or
2. a building's roof between the hot-liquid manifold-tank 26 and the hot-liquid storage-tank 22 if the hot-liquid storage-tank 22 is hidden underneath the roof.

Figure 2A:
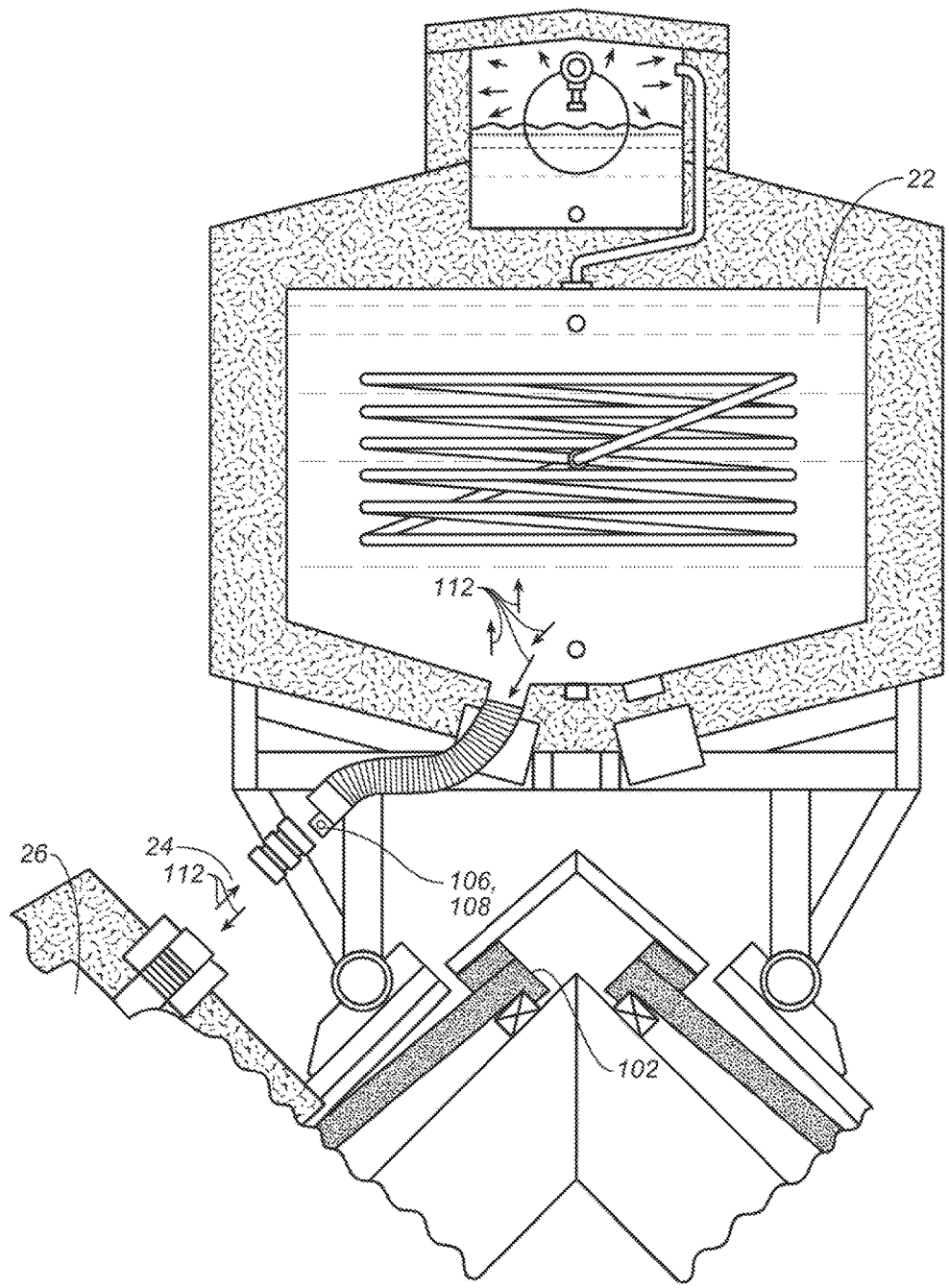
FIG. 2A is a cross-sectional elevational view of the solar system's hot-liquid storage-tank depicted in FIG. 1 during daytime while heating liquid that illustrates an air pressure chamber and float valve near a top of the hot-liquid storage-tank.
Figure 2C:
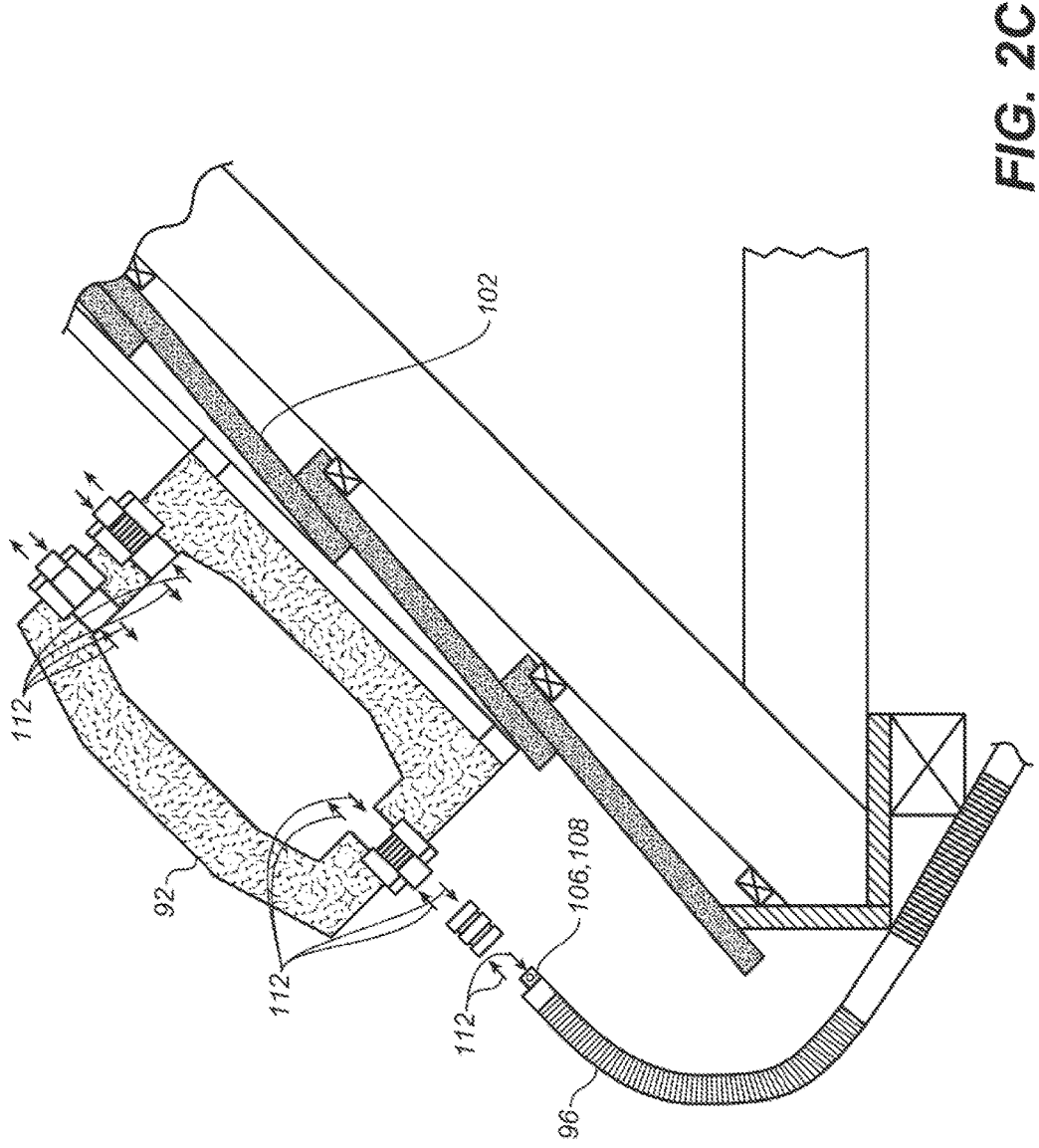
Figure 2D:
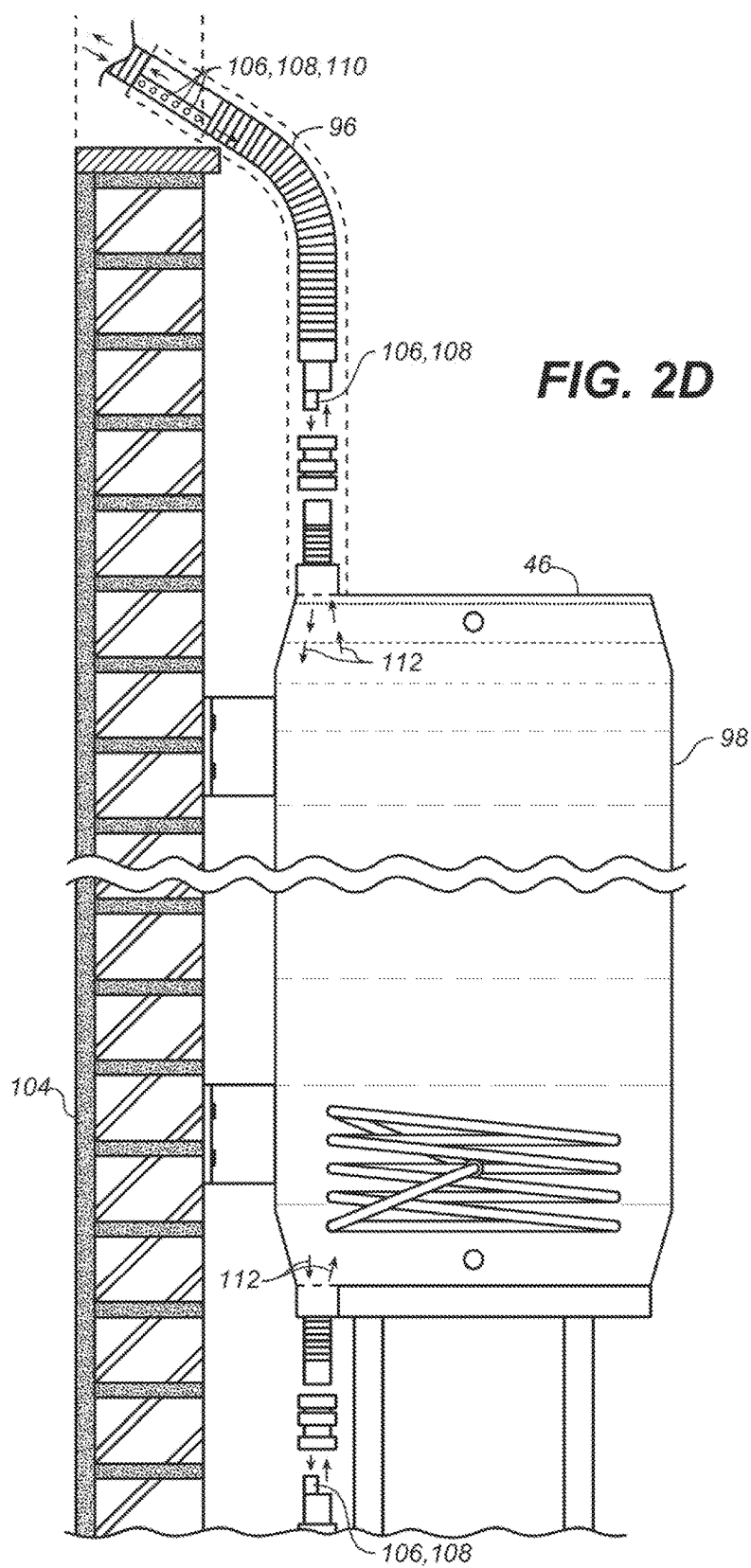
FIG. 2D is a cross-sectional elevational view of the solar system's cold liquid storage tank depicted in FIG. 1 during daytime while heating liquid, the cold liquid storage tank preferably cooling the inside of the building, and any liquid thus warmed rising up to the glazed heating-tubes thereby contributing heat to the hot-liquid storage-tank.
Figure 3A:
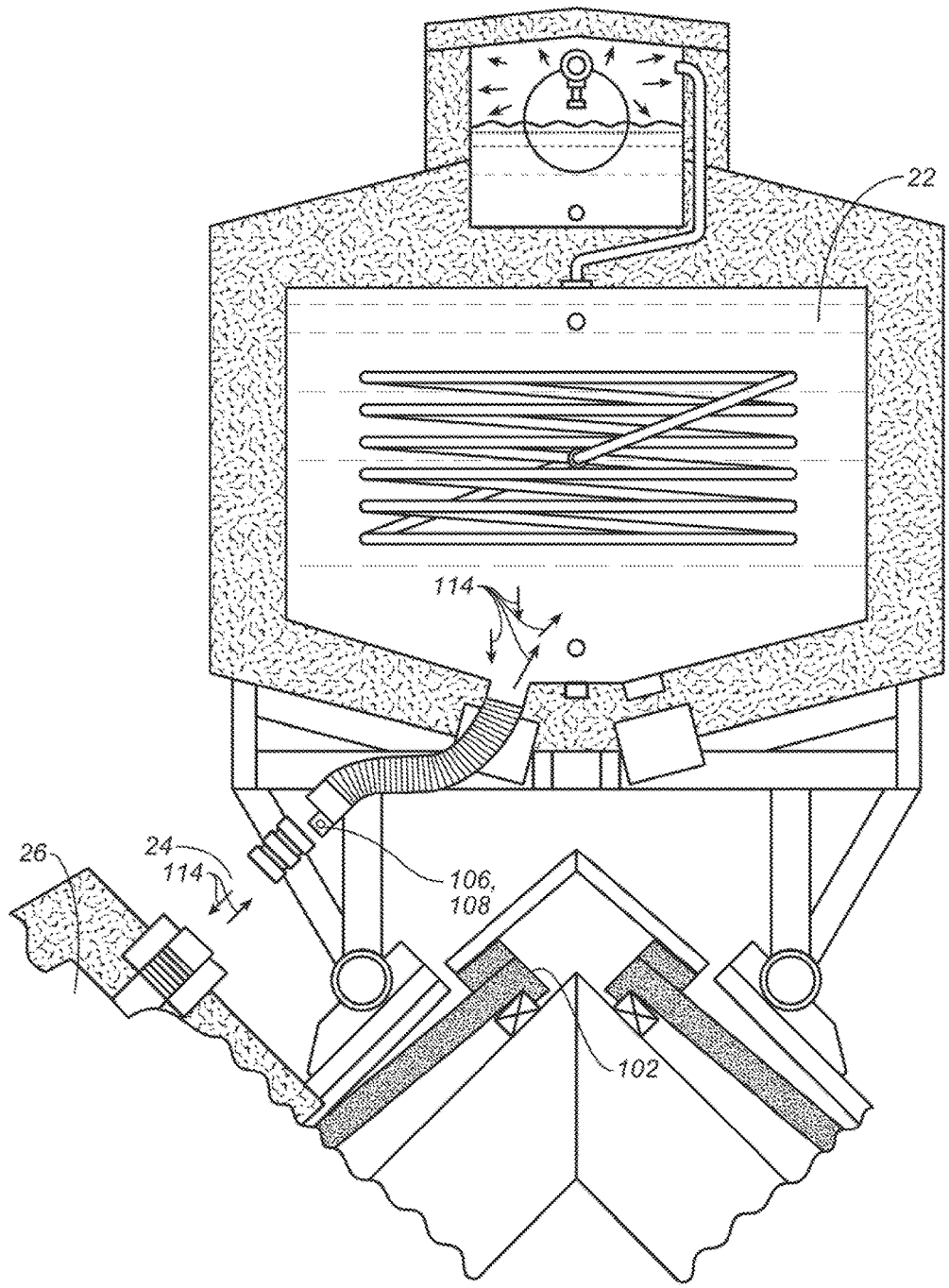
FIG. 3A is a cross-sectional elevational view of the solar system's hot-liquid storage-tank depicted in FIGS. 1 and 2A during nighttime while cooling liquid.
Figure 3C:
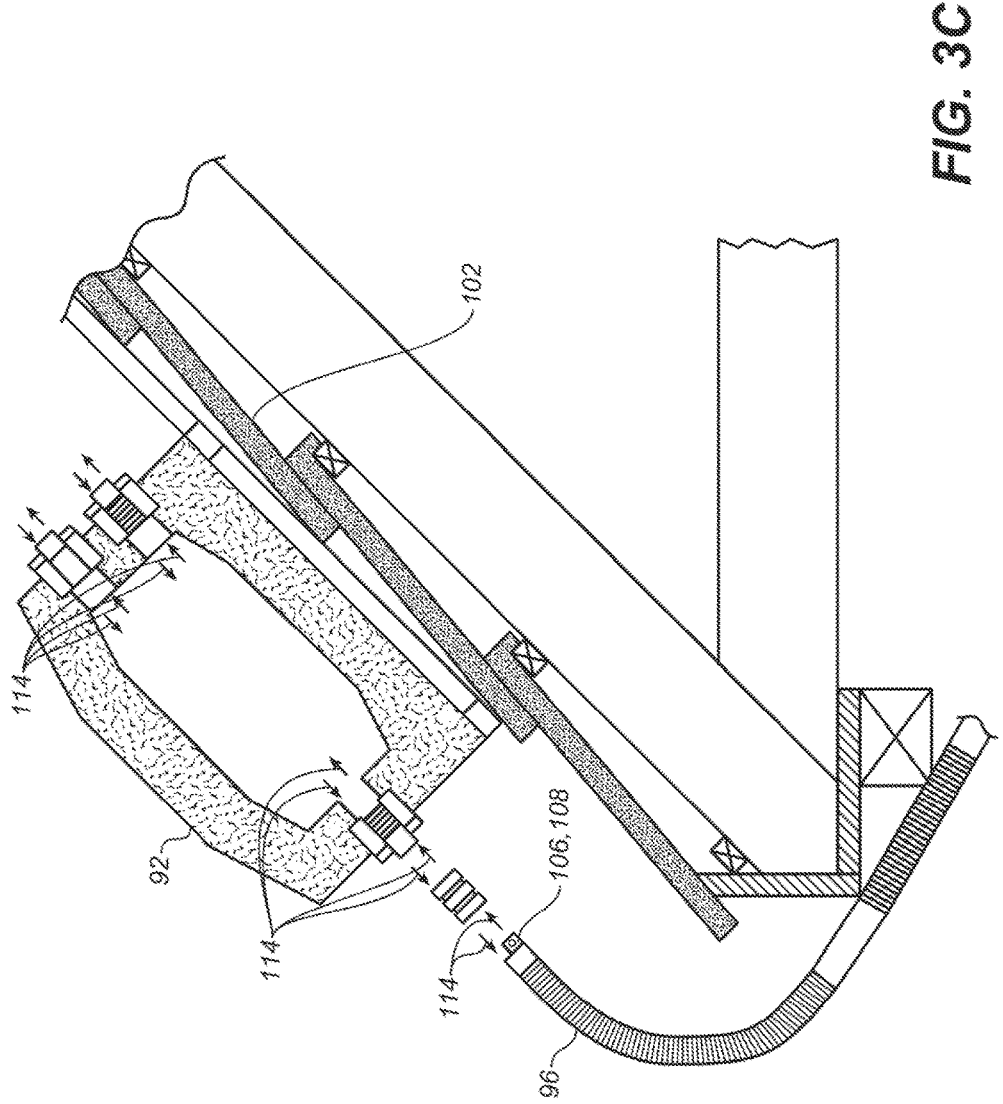
Figure 3D:
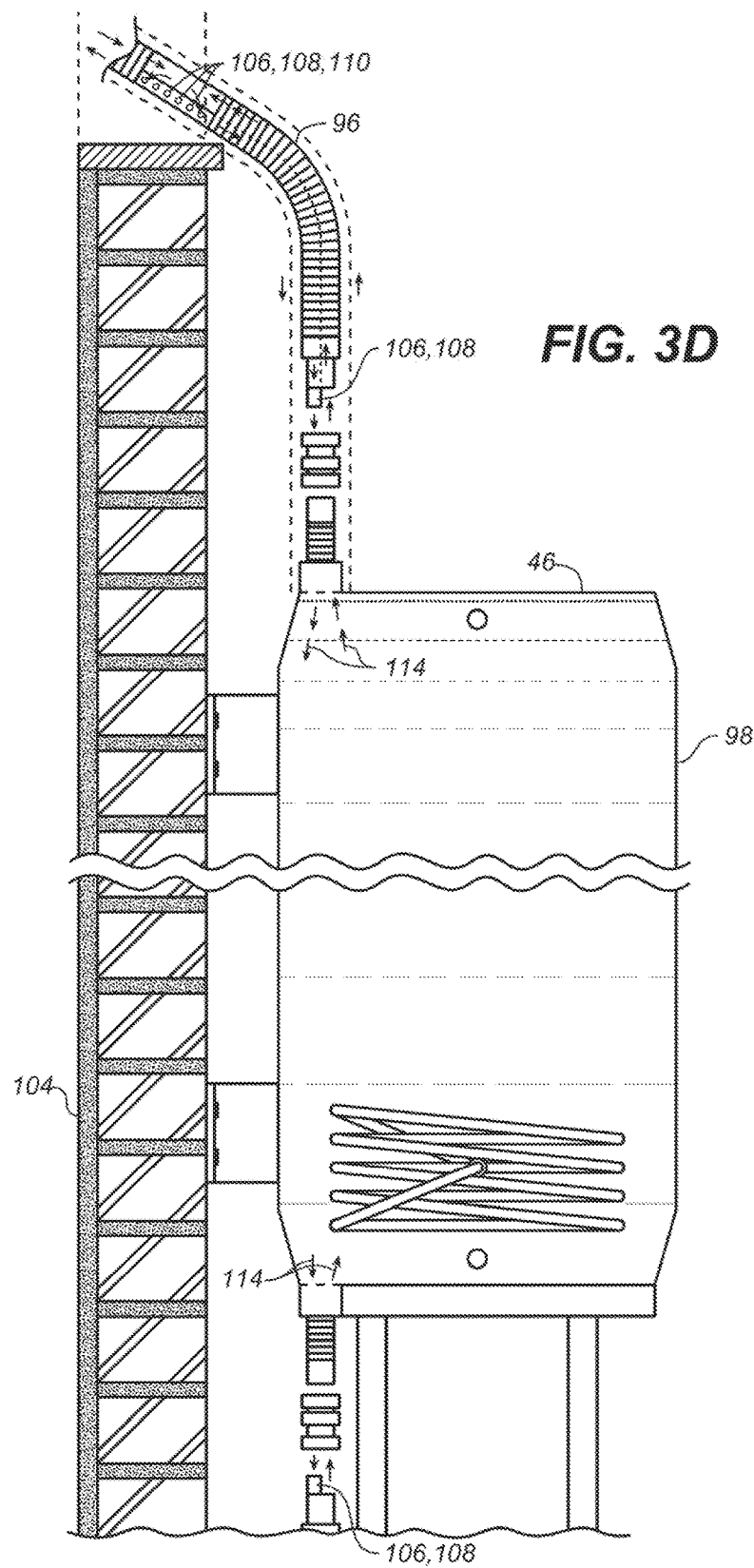
FIG. 3D is a cross-sectional elevational view of the solar system's cold liquid storage tank depicted in FIG. 1 and FIG. 2D during nighttime while cooling liquid.
Figure 3E:
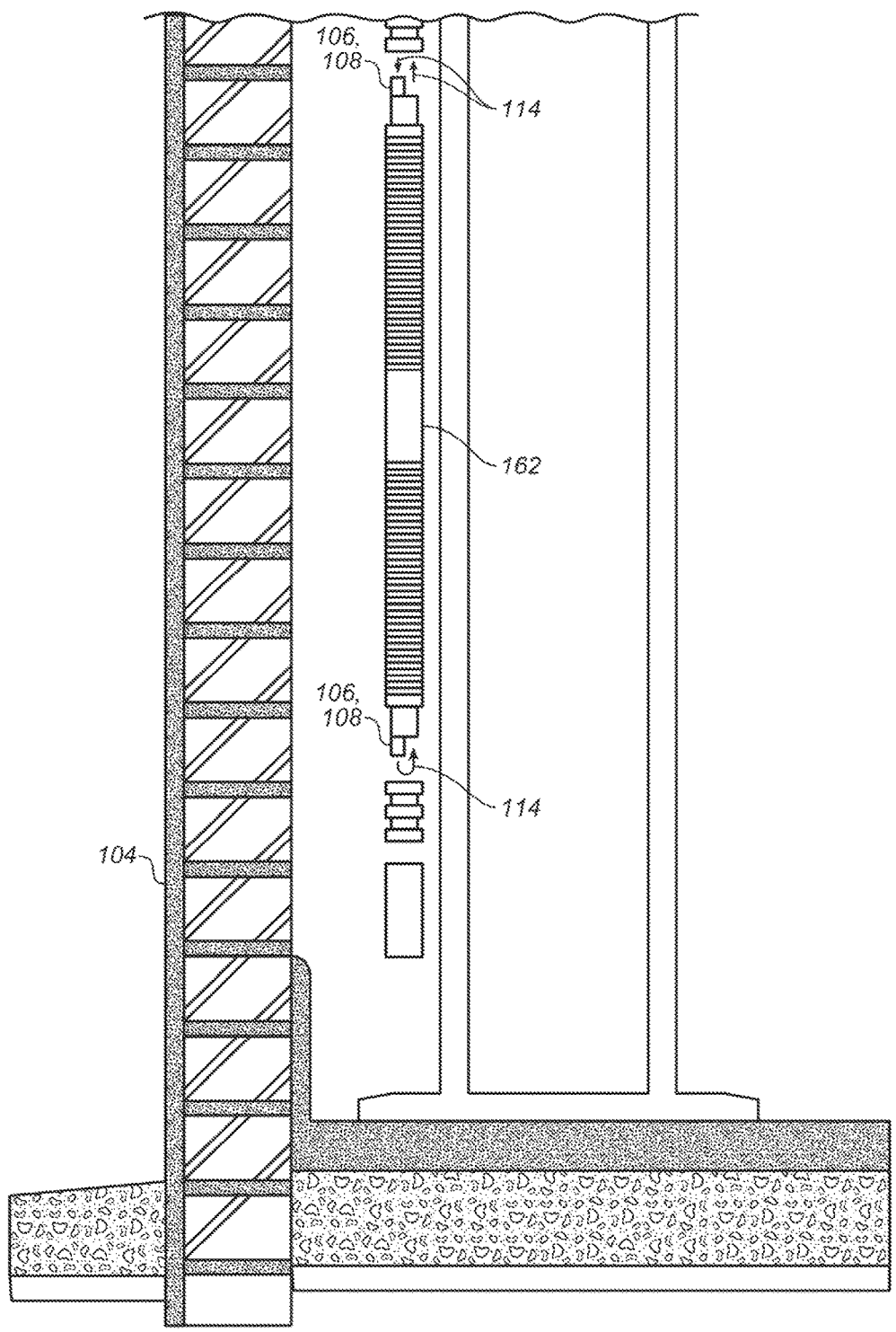
FIG. 3E is a cross-sectional elevational view of the solar system's cooling radiator together with the support frame therefor depicted in FIGS. 1 and 2E during nighttime while cooling liquid.

Such flow reversal transition zones occur in these other places due to a change in temperature along the length of the coaxial heating-and-cooling tubes 24, 96 where the coaxial heating-and-cooling tubes 24, 96 passes from one environment to another environment. Accommodating the coaxial heating-and-cooling tubes 24, 96 to the presence of such transition zones is preferably accomplished by locating a junction between shorter length sections of coaxial heating-and-cooling tubes abutted end to end where the transition zone occurs. Equivalently, a longer coaxial heating-and-cooling tube may be custom fabricated with perforations 108 appropriately located along the length of the inner tube 106 so that upon installing the custom fabricated coaxial heating-and cooling tube in a building the perforations 108 become located at transition zones. FIGS. 2D and 3D illustrate such a custom fabricated coaxial heating-and-cooling tube 96 that includes a segment 110 where the inner tube 106 includes perforations 108 located along the length of the inner tube between the ends thereof.

Small arrows 112 in FIGS. 2A-2G depict liquid flows that typically occur throughout the solar liquid-heating-and-cooling system 20 during daytime heating. Small arrows 114 in FIGS. 3A-3G depict liquid flows that typically occur throughout the solar liquid-heating-and-cooling system 20 during nighttime cooling.

Figure 4:
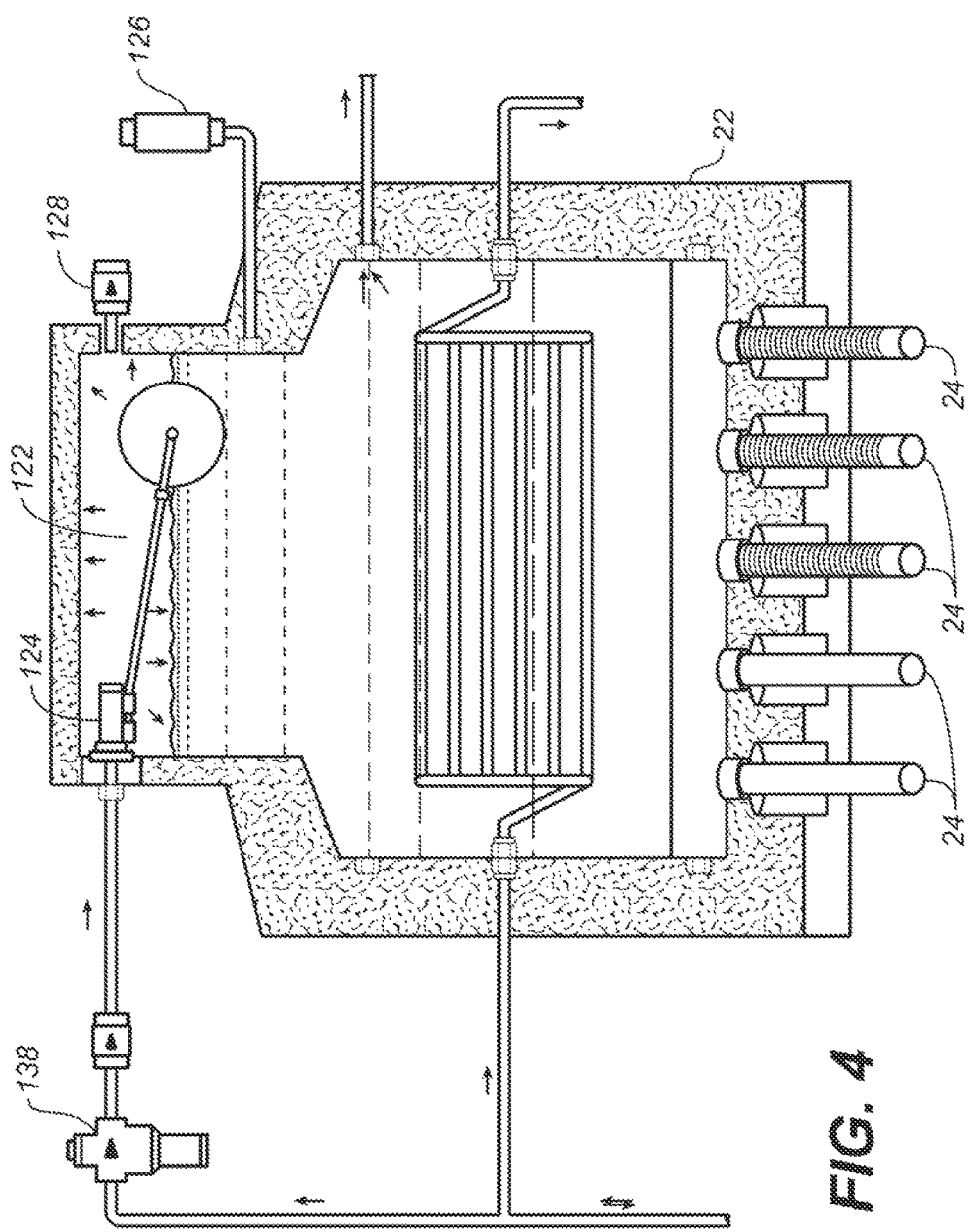
FIG. 4 is a cross-sectional view of the hot-liquid storage-tank depicted in FIGS. 1, 2A and 3A taken along the line 4-4 in FIG. 1.

In a preferred embodiment of the solar liquid-heating-and-cooling system 20, as best illustrated in FIG. 4 the hot-liquid storage-tank 22 includes an air pressure chamber 122 located at the top thereof. An inlet float valve 124, located near the top of the hot-liquid storage-tank 22, permits filling the solar liquid-heating-and-cooling system 20 to a pre-established liquid level within the hot-liquid storage-tank 22.

Preferably, the hot-liquid storage-tank 22 also includes an external float-type air vent 126 that is coupled to liquid present within the hot-liquid storage-tank 22. The float-type air vent 126 includes a small floating ball located beneath a close fitting valve seat that connects with the environment surrounding the float-type air vent 126. Since the float-type air vent 126 permits air to flow out of or into the hot-liquid storage-tank 22, the float-type air vent 126 facilitates filling an empty solar liquid-heating-and-cooling system 20. Liquid flowing through the inlet float valve 124 ultimately raises the liquid level within the hot-liquid storage-tank 22 until the liquid lifts the floating ball within the float-type air vent 126 pushing the ball up against the valve seat thereby closing the external float-type air vent 126. When the external float-type air vent 126 closes, liquid continues filling the hot-liquid storage-tank 22 until the inlet float valve 124 rises to the pre-established liquid level established by the inlet float valve 124. Operating in this way the float-type air vent 126 communicating with the surrounding environment serves as an air inlet and outlet valve during draining and filling of the solar liquid-heating-and-cooling system 20.

The hot-liquid storage-tank 22 also includes an air inlet valve 128 that is coupled to the air pressure chamber 122 within the hot-liquid storage-tank 22 above liquid present within the hot-liquid storage-tank 22. Under certain environmental circumstances, perhaps due to contraction of fluids within the solar liquid-heating-and-cooling system 20 at night or during cloudy periods, air pressure within the air pressure chamber 122 may possibly become less than that of atmosphere surrounding the solar liquid-heating-and-cooling system 20. When such a condition occurs, the air inlet valve 128 ensures that at all times air pressure within the air pressure chamber 122 remains near or above that of the atmosphere surrounding the solar liquid-heating-and-cooling system 20.

As best illustrated in FIG. 5, opposite ends of the hot-liquid manifold-tank 26 preferably includes a pair of adjustable pressure-relief expansion valves 132. With the hot-liquid storage-tank 22 full and the external float-type air vent 126 closed, during daytime hot liquid in the hot-liquid storage-tank 22 heats air in the air pressure chamber 122 thereby raising pressure within the solar liquid-heating-and-cooling system 20 until it exceeds a value pre-established for the pressure-relief expansion valves 132. When the liquid pressure exceeds the value pre-established for the pressure-relief expansion valves 132, the pressure-relief expansion valves 132 open and discharge liquid through a pair of expansion spray tubes 134 that respectively extend from each of the adjustable pressure-relief expansion valves 132 downward along the lower layer of unglazed cooling-tubes 54. Liquid spraying from each expansion spray tube 134 descends both onto the unglazed cooling-tubes 56, and onto the cooling fins 82 extending therefrom. Because discharging liquid through the adjustable pressure-relief expansion valves 132 lowers the liquid level within the hot-liquid storage-tank 22, the inlet float valve 124 opens, and the inlet float valve 124 begins adding cooler liquid to the liquid already in the hot-liquid storage-tank 22 until again reaching the pre-established liquid level. The cooler liquid entering the hot-liquid storage-tank 22 through the inlet float valve 124 cools the air inside the air pressure chamber 122.

The cooling fins 82 extending from the unglazed cooling-tubes 56 preferably have an angular configuration and overlap thereby letting air flow through while barring water from dripping through. In this way the heating-and-cooling collector-array-panel 32 may provide a roof covering substituting for or perhaps merely assisting conventional roofing.

Expansion of liquid discharged from each expansion spray tube 134 both onto the unglazed cooling-tubes 56, and onto the cooling fins 82 advantageously lowers the liquid's temperature thereby increasing its effectiveness for cooling the unglazed cooling-tubes 56, and the cooling fins 82 extending therefrom. After a liquid discharge, the inlet float valve 124 opens and adds cooler liquid to that tank. While the sun is shining, the solar liquid-heating-and-cooling system 20 repetitively first discharges some liquid from both pressure-relief expansion valves 132 and then adds cooler liquid to the hot-liquid storage-tank 22. Daily, the solar liquid-heating-and-cooling system 20 discharges a certain amount of liquid depending upon the total capacity of the system 20 and liquid temperature in the hot-liquid storage-tank 22. The maximum amount of liquid discharged daily through the pressure-relief expansion valves 132 can be controlled by appropriately adjusting:

1. the pre-established liquid level within the hot-liquid storage-tank 22;
2. the pressure-relief expansion valves 132;
3. the float-type air vent 126; and
4. an adjustable pressure reducing valve 138, located as depicted in FIG. 4 outside the hot-liquid storage-tank 22, that connects in series with the inlet float valve 124 for controlling a rate at which the hot-liquid storage-tank 22 refills.

A slower refill rate for the hot-liquid storage-tank 22 lengthens the interval between discharges through the expansion spray tubes 134 atop each of the adjustable pressure-relief expansion valves 132 thereby reducing cumulative total liquid discharge.

As described above, the cooling fins 82 are configured to form a trough 88 for receiving and holding liquid when the heating-and-cooling collector-array-panel 32 is inclined at an angle. Evaporation of liquid from the trough 88 of each cooling fin assisted by air flowing through the venturi-like openings 68 of the parabolic-trough mirror reflectors 64 and through the slots 84 between immediately adjacent cooling fins 82 further cools the unglazed cooling-tubes 56.

Figure 7:
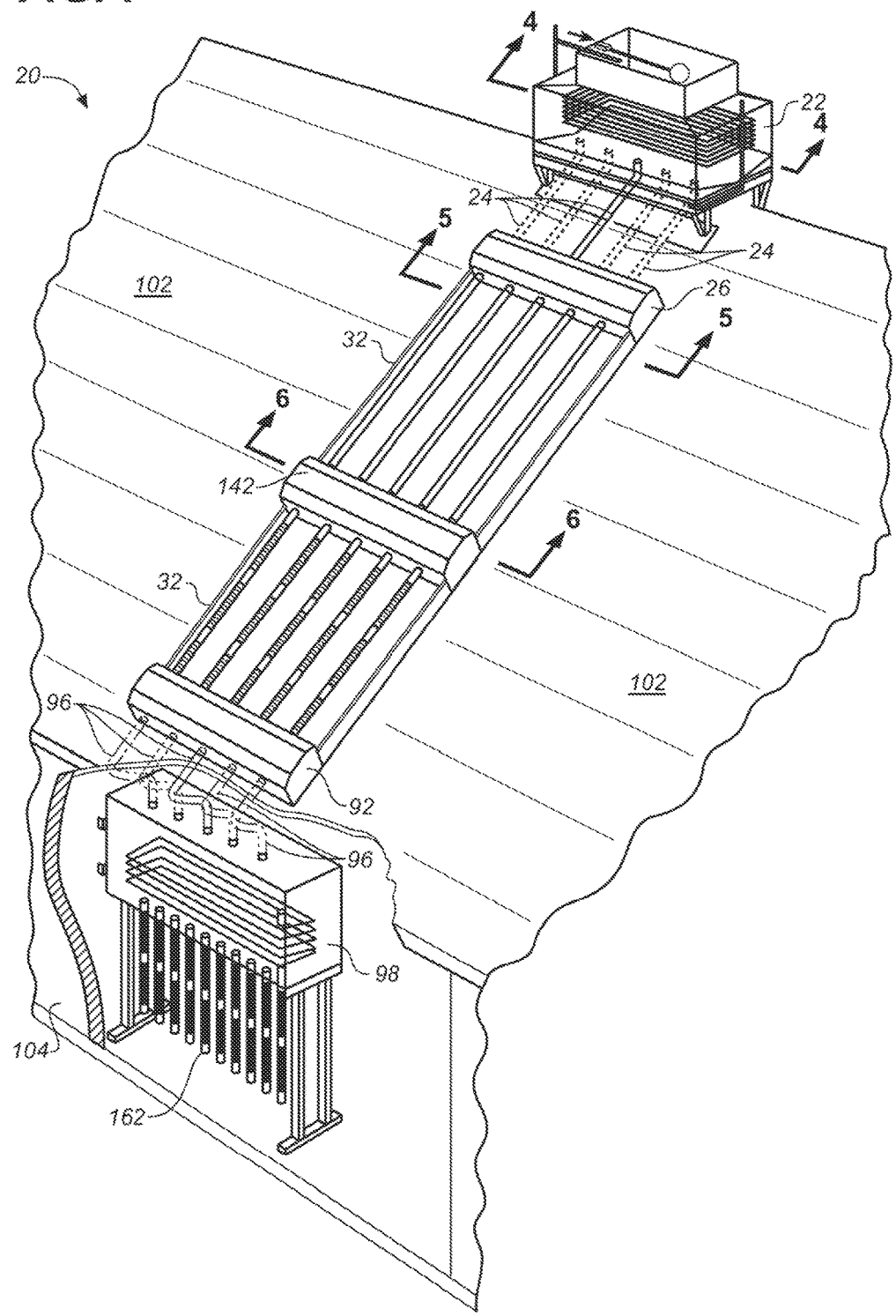
FIG. 7, a partially cut away perspective view of a solar liquid-heating-and-cooling system in accordance with the present disclosure that is similar to the illustration of FIG. 1 and that is advantageously adapted for installation on a long span roof, depicts.

FIG. 7 depicts a solar liquid-heating-and-cooling system 20 in accordance with the present disclosure that is advantageously adapted for installation on a long span roof 102. The solar liquid-heating-and-cool ing system 20 depicted in of FIG. 7 includes a pair of double layer passive thermosyphon heating-and-cooling collector-array-panels 32 of the type depicted in FIGS. 1-6 and described above. An intermediate manifold tank 142, located between upper and lower solar heating-and-cooling collector-array-panels 32, resembles the upper hot-liquid manifold-tank 26 and lower cold-liquid manifold-tank 92 depicted in FIG. 1. Opposite sides of the intermediate manifold tank 142 receive ends of glazed heating-tubes 36 and of unglazed cooling-tubes 56 included respectively in each upper and lower layers 34, 54 of both heating-and-cooling collector-array-panels 32. To assist in cooling the unglazed cooling-tubes 56 of the lower solar heating-and-cooling collector-array-panel 32, the intermediate manifold tank 142 includes a pair of adjustable pressure-relief expansion valves 132 that are identical or similar to those included in the upper hot-liquid manifold-tank 26. Configured in this way, the intermediate manifold tank 142 operationally concatenates the pair of double layer passive thermosyphon solar heating-and-cooling collector-array-panels 32 into a single longer heating-and-cooling collector-array-panel 32 adapted for installation on a long span roof 102.

FIG. 8 depicts a preferred configuration for using the double layer passive thermosyphon solar heating-and-cooling collector-array-panel 32. FIG. 8's configuration preferably locates the insulated hot-liquid storage-tank 22 above a roof vent 144 at the peak of the roof ridge or at an upper portion of the roof directly above an interior space being cooled. FIG. 8's configuration also preferably locates the double layer heating-and-cooling collector-array-panel 32 above a roof vent 146 lower down on the roof directly above the interior space being cooled. As explained in greater detail below, lower surfaces of the cooling fins 82 facing the roof above the interior space being cooled preferably have a selective heat absorbing coating.

During daytime and nighttime, air cooled by evaporating liquid in the cooling fins 82 sinks through the lower roof vent 146 to cool the interior space below. Conversely, heated air from the interior space rises up through the upper roof vent 144 and contributes some heat to the insulated hot-liquid storage-tank 22. In this way, the solar liquid-heating-and-cooling system 20 recovers some heat from air leaving the interior space by warming the insulated hot-liquid storage-tank 22 while air simultaneously cools the interior space.

Furthermore, uninsulated cooling fins 82 chilled by evaporating liquid absorb thermal radiation emitted from the interior space being cooled. Coating lower surfaces of the cooling fins 82 with a thermal radiation absorptive coating such as a black selective absorbent coat ing or the like, assists such radiative cooling.

If in very humid environments condensation forms on lower surfaces of the cooling fins 82, the heating-and-cooling collector-array-panel 32 may further include drip troughs 148 (illustrated in FIGS. 2B and 3B) that are located below the cooling fins 82. The cooling fins 82 catch such condensation and channel the condensate down and away from the lower roof vent 146 similar to what is done in air conditioning split system's indoor units. Alternatively, the lower roof vent 146 may be sited above an internal courtyard having floor drains so occasional dripping condensation will not be an issue and can be channeled away to the floor drains.

An alternative or addition to discharged liquid spraying from the expansion spray tubes 134 downward both onto the unglazed cooling-tubes 56 and onto cooling fins 82 extending therefrom, the unglazed cooling-tubes 56 may be made from a liquid permeable material. Examples of liquid permeable material that may be used for the unglazed cooling-tubes 56 are clay pipe, bamboo pipe, and semipermeable membrane materials such as Gore-Tex™, Sympatex™, Triple-Point Ceramic™, Omni-Tech and H₂NO Storm HB. Making the unglazed cooling-tubes 56 from a liquid permeable material allows liquid within the unglazed cooling-tubes 56 to pass therethrough and evaporate into atmosphere around the unglazed cooling-tubes 56 to further cool the unglazed cooling-tubes 56 and the liquid therein.

To prevent insects, such as mosquitoes, from breeding in the heating-and-cooling collector-array-panel 32 or birds from nesting there, the heating-and-cooling collector-array-panel 32 can be covered with a suitable netting or mesh. Similarly, a proper installation of the heating-and-cooling collector-array-panel 32 will include molded roof flashing edges and side gutters to prevent rain water from entering the interior space.

If the double layer passive thermosyphon solar heating-and-cooling collector-array-panel 32 were installed without roof vents 144, 146 depicted in FIG. 8, then the solar liquid-heating-and-cooling system 20 only captures cooling present in the chilled liquid flowing via the one or more coaxial heating-and-cooling tubes 96 from the cold-liquid manifold-tank 92 to the cold-liquid storage-tank 98. Such an installation of the heating-and-cooling collector-array-panel 32 wastes to the surrounding atmosphere cooling capacity provided by air flowing through the venturi-like openings 68 and through the slots 84 between immediately adjacent cooling fins 82 of the heating-and-cooling collector-arraypanel 32. Conversely, installing the double layer passive thermosyphon solar heating-and-cooling collector-array-panel 32 as depicted in FIG. 8 significantly betters its efficiency since there is no loss of chilled air produced by the cooling fins 82 since it sinks via the roof vent 146 into and cools the interior space and is assisted by absorption by the cooling fins 82 of thermal radiation emitted from the interior space.

FIGS. 9 and 10 illustrates an auxiliary refill system 152 for the troughs 88. The auxiliary refill system 152 includes a refill tank 154 that is coupled to and receives liquid from one of the cooling fins 82, preferably the lowest cooling fin 82 in the heating-and-cooling collector-array-panel 32. A float valve 156, that includes a float ball 158 located in the refill tank 154, responsive to the level of liquid in the refill tank 154, controls a flow of liquid into one of the cooling fins 82 higher in the heating-and-cooling collector-array-panel 32, preferably the highest cooling fin 82.

In hot, dry climates where the rate of evaporation of liquid from the liquid filled troughs 88 of the cooling fins 82 may exceed the rate of expansion refill of the hot-liquid storage-tank 22 described above, the liquid filled trough 88 might become dry during the day. When the evaporation rate exceeds the expansion refill rate from the hot-liquid storage-tank 22, the liquid level in the lower trough 88 will drop as will the liquid level in all the troughs 88. The lower liquid level in the lower trough 88 causes the float ball 158 to drop slightly and open the float valve 156 thereby refilling the higher trough 88. Liquid overflowing from higher troughs 88 cascades downward into the next lower trough 88 to ultimately refill the lowest trough 88 that is coupled to the refill tank 154. The configuration of the cooling fins 82 depicted in FIG. 10 catches all drips or overflows from a higher cooling fin 82 to a lower cooling fin 82 for a wide range of possible roof slope angles. In this way the auxiliary refill system 152 keeps all of the troughs 88 from top to bottom filled with liquid.

If installed over a roof vent opening, the heating-and-cooling collector-array-panel 32 is installed as depicted in FIG. 9 with the lowest cooling fin 82 below the roof vent 146 so any liquid overflowing from the lowest trough 88 discharges harmlessly onto the roof tiles or roof flashing gutter. Alternatively, the installation of the solar liquid-heating-and-cooling system 20 may include an overflow channel beneath the lowest cooling fin 82 to divert liquid overflowing from the lowest trough 88 so no liquid or rain could fall through the roof vent 146.

In comparison with single layer solar panels, during daytime the heating-and-cooling collector-array-panel 32 exhibits a greater temperature difference between warmer liquid in the glazed heating-tubes 36 and cooler liquid in the lower layer of unglazed cooling-tubes 54. For reasons explained in greater detail below, the presence of both the upper layer of glazed heating-tubes 34 and the lower layer of unglazed cooling-tubes 54 facilitates warmer liquid circulating in the glazed heating-tubes 36 for heating separate from and unmixed with cooler liquid circulating in the unglazed cooling-tubes 56 for cooling.

During marginal solar radiation conditions such as at sunrise or sunset most single layer solar panels stagnate, i.e. they nether heat nor cool. Consider now the heating-and-cooling collector-array-panel 32 assuming that there is some cooler liquid in the heating-and-cooling collector-array-panel 32 that is insufficiently cold to sink down to the cold-liquid manifold-tank 92. If there is rising warmer liquid in the heating-and-cooling collector-array-panel 32 flowing toward the hot-liquid manifold-tank 26 such flowing warmer liquid urges the cooler liquid in the heating-and-cooling collector-array-panel 32 downward toward the cold-liquid manifold-tank 92 from which the cool liquid can enter lower ends of the unglazed cooling-tubes 56 for further cooling. In this way rising warmer liquid in the heating-and-cooling collector-array-panel 32 flowing toward the hot-liquid manifold-tank 26 initiates thermosyphonic flow throughout the heating-and-cooling collector-array-panel 32.

Conversely, if warmer liquid in the heating-and-cooling collector-array-panel 32 lacks sufficient buoyancy to flow upward concurrently there also exists cooler liquid in the unglazed cooling-tubes 56 due to attachment of the cooling fins 82 thereto. Because liquid within the unglazed cooling-tubes 56 is cooler it sinks downward toward the cold-liquid manifold-tank 92 thereby initiating thermosyphonic flow throughout the heating-and-cooling collector-array-panel 32.

Such cooler liquid initiation of the thermosyphonic flow throughout the heating-and-cooling collector-array-panel 32 urges the insufficiently buoyant warmer liquid in the heating-and-cooling collector-array-panel 32 to rise. Thus, even if warmer liquid in the heating-and-cooling collector-array-panel 32 lacks sufficient buoyancy to rise toward the hot-liquid manifold-tank 26 cooler liquid in the unglazed cooling-tubes 56 urges the insufficiently buoyant warmer liquid in the heating-and-cooling collector-array-panel 32 to rise toward the hot-liquid manifold-tank 26. As stated above, when warmer liquid in the heating-and-cooling collector-array-panel 32 rises toward the hot-liquid manifold-tank 26 that urges cooler liquid in the heating-and-cooling collector-array-panel 32 downward toward the cold-liquid manifold-tank 92 from which the cool liquid can enter lower ends of the unglazed cooling-tubes 56 for further cooling.

Consequently, when marginal solar conditions occur the heating-and-cooling collector-array-panel 32 starts thermosyphonic flow sooner and stops later than most single layer solar panels. Starting thermosyphonic flow sooner and stopping it later keeps the heating-and-cooling collector-array-panel 32 working efficiently even deep into marginal solar conditions. The heating-and-cooling collector-array-panel 32 operates better during marginal solar conditions because the hot-liquid manifold-tank 26 and the cold-liquid manifold-tank 92 permit coupling kinetic energy (momentum) between the upper layer of glazed heating-tubes 34 and the lower layer of unglazed cooling-tubes 54. That is, the glazed heating-tubes 36 coupled to the unglazed cooling-tubes 56 by the hot-liquid manifold-tank 26 and the cold-liquid manifold-tank 92 lessen stagnation within the heating-and-cooling collector-array-panel 32 during intervals of marginal solar radiation.

INDUSTRIAL APPLICABILITY

Preferably, the solar liquid-heating-and-cooling system 20 includes a cooling radiator tube array 162 depicted in FIGS. 1, 2, 2E, 3, 3E, 7 and 8 that is located below and coupled to the cold-liquid storage-tank 98. The cooling radiator tube array 162 includes thermosyphon coaxial cooling tubes that depend beneath the cold-liquid storage-tank 98. Preferably, the thermosyphon coaxial cooling tubes of the cooling radiator tube array 162 are the same as or similar to the unglazed cooling-tubes 56 included in the heating-and-cooling collector-array-panel 32. Cool water in the thermosyphon coaxial cooling tubes of the cooling radiator tube array 162 absorbs heat from within the building 104 through black absorptive surfaces on the thermosyphon coaxial cooling tubes. Hotter water inside the tubes rises up between surfaces of outer and inner coaxial tubes of the cooling radiator tube array 162 while cooler water descends in the inner coaxial tubes. In this way the thermosyphon coaxial heating/cooling tubes of the cooling radiator tube array 162 absorb heat from the room thereby cooling the room. During nighttime, water heated in this way in the thermosyphon coaxial cooling tubes of the cooling radiator tube array 162 eventually rises to the hot-liquid storage-tank 22 atop the coaxial heating-and-cooling tube 24 where it contributes to heating liquid within the hot-liquid storage-tank 22. Therefore, the heat collected from within the building 104 is eventually reused as hot water thereby providing a very efficient heat recovery system.

Figure 2E:
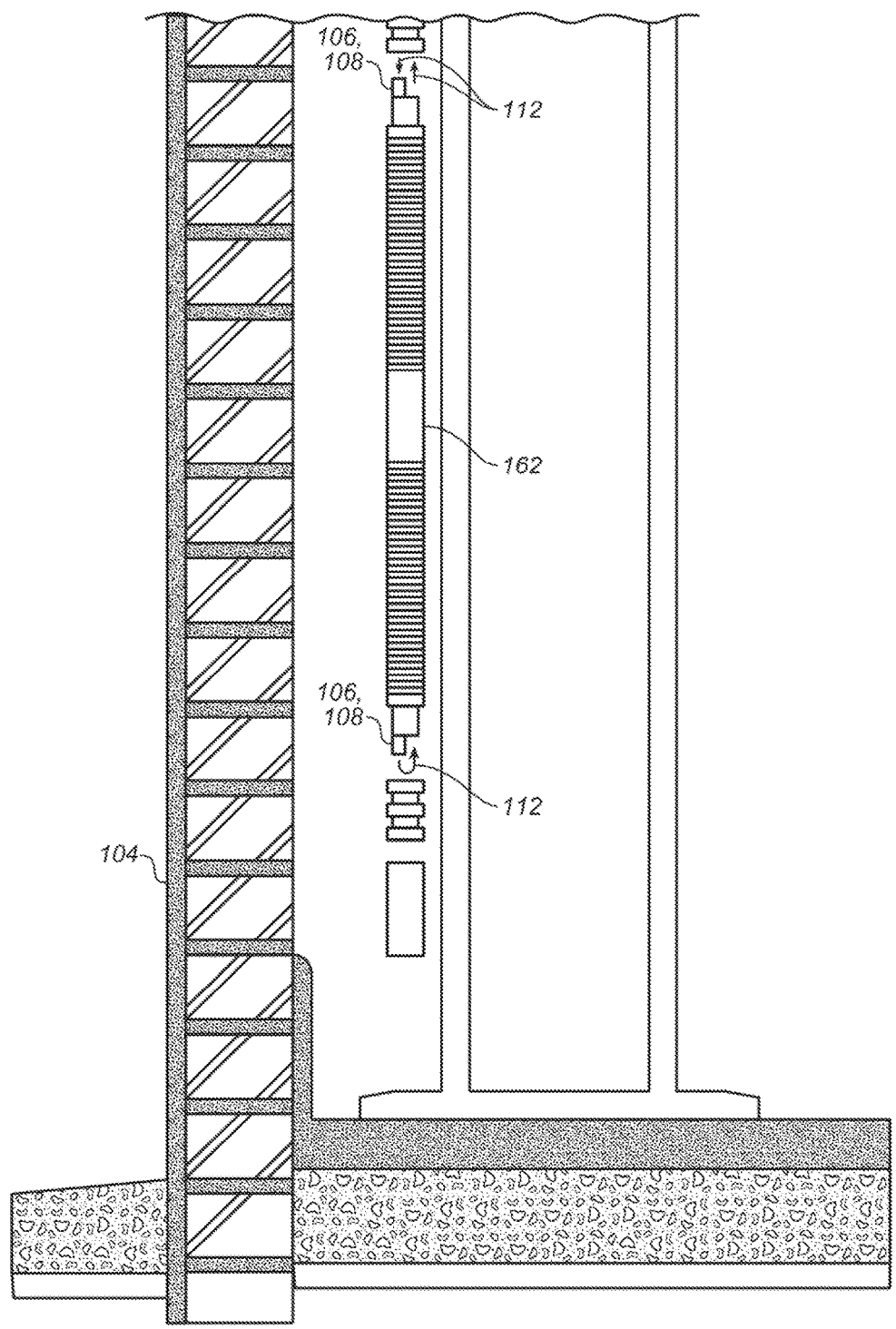
FIG. 2E is a cross-sectional elevational view of the solar system's cooling radiator tube array together with the support frame therefor depicted in FIG. 1 during daytime while heating liquid, the cooling radiator absorbing heat from inside the building.

Although the present invention has been described in terms of the presently preferred embodiment, it is to be understood that such disclosure is purely illustrative and is not to be interpreted as limiting. For example, the glazed heating-tubes 36 included in the upper layer of glazed heating-tubes 34, the unglazed cooling-tubes 56 of the lower layer of unglazed cooling-tubes 54 and the tubes of the cooling radiator tube array 162 preferably have a coaxial structure of the type disclosed in U.S. Pat. No. 6,014,968 that is hereby incorporated by reference as though fully set forth here. Similarly, as illustrated in FIG. 2E the glazed heating-tubes 36 included in the upper layer of glazed heating-tubes 34, the unglazed cooling-tubes 56 of the lower layer of unglazed cooling-tubes 54 and the tubes of the cooling radiator tube array 162 are preferably corrugated transversely to their length. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:

1. A double layer passive thermosyphon solar heating-and-cooling collector-array-panel (32) capable of simultaneous heating and cooling liquid flows, the collector-array-panel (32) being adapted for inclusion in a solar liquid-heating-and-cooling system (20) that also has:
    a. a hot-liquid manifold-tank (26) located above the collector-array-panel (32);
    b. a cold-liquid manifold-tank (92) located below the collector-array-panel (32);
    c. at least one coaxial heating-and-cooling tube (24) connected directly to and communicating between the hot-liquid manifold-tank (26) and a hot-liquid storage-tank (22) located above the hot-liquid manifold-tank (26); and
    d. at least one coaxial heating-and-cooling tube (96) connected directly to and communicating between the cold-liquid manifold-tank (92) and a cold liquid storage tank (98) that is located below the cold-liquid manifold-tank (92);
the heating-and-cooling collector-array-panel (32) comprising:
    a. an upper layer (34) of glazed heating-tubes (36) each of which has a solar absorptive surface (42), opposite ends of the glazed heating-tubes (36) being respectively adapted for connecting directly to and communicating directly with both the hot and the cold-liquid manifold-tanks (26, 92);
    b. a lower layer (54) of unglazed cooling-tubes (56) each of which has a heat radiating surface (58), opposite ends of the unglazed cooling-tubes (56) also being respectively adapted for connecting directly to and communicating directly with both the hot and the cold-liquid manifold-tanks (26, 92), the lower layer (54) of unglazed cooling-tubes (56) being located beneath the upper layer (34) of glazed heating-tubes (36) when the heating-and-cooling collector-array-panel (32) is inclined at an angle facing the sun; and
    c. parabolic-trough mirror reflectors (64) that are located between the upper layer (34) of glazed heating-tubes (36) and the lower layer (54) of unglazed cooling-tubes (56),
whereby during day or night rising or sinking air flowing past the heated or cooled parabolic-trough mirror reflectors (64) and the glazed heating-tubes (36) is accelerated through the venturi like openings (68) of each parabolic-trough mirror reflector (64) for blowing around the unglazed cooling-tubes (56) thereby bettering cooling thereof.

2. The heating-and-cooling collector-array-panel (32) of claim 1 wherein at least one (1) of the unglazed cooling-tubes (56) includes at least two (2) trough-shaped, thermally-connected cooling fins (82), the cooling fins (82):
    a. establishing a slot (84) through which air can flow; and
    b. each cooling fin (82) being adapted for receiving liquid whereby evaporation of liquid from each cooling fin (82) further cools the unglazed cooling-tube (56).

3. The heating-and-cooling collector-array-panel (32) of claim 1 wherein the parabolic-trough mirror reflector (64) is hollow.

4. The heating-and-cooling collector-array-panel (32) of claim 1 wherein the glazed heating-tubes (36) of the upper layer (34) have a coaxial structure.

5. The heating-and-cooling collector-array-panel (32) of claim 1 wherein the unglazed cooling-tubes (56) of the lower layer (54) have a coaxial structure.

6. The heating-and-cooling collector-array-panel (32) of claim 1 wherein the glazed heating-tubes (36) of the upper layer (34) are corrugated.

7. The heating-and-cooling collector-array-panel (32) of claim 1 wherein the unglazed cooling-tubes (56) of the lower layer (54) are corrugated.

8. The heating-and-cooling collector-array-panel (32) of claim 1 wherein surfaces of cooling fins (82) of an installed collector-array-panel (32) that face an interior space of a building are coated with heat absorptive coating.

9. The heating-and-cooling collector-array-panel (32) of claim 1 further comprising drip troughs (148) that are:
    a. located between the cooling fins (82) of an installed collector-array-panel (32) and an interior space of a building; and
    b. adapted for catching condensate that drips from the cooling fins (82).

10. A solar liquid-heating-and-cooling system (20) comprising:
    a. a hot-liquid storage-tank (22);
    b. a hot-liquid manifold-tank (26) located below the hot-liquid storage-tank (22) that is connected directly to and communicates directly with the hot-liquid storage-tank (22) via at least one coaxial heating-and-cooling tube (24);
    c. at least one double layer passive thermosyphon solar heating-and-cooling collector-array-panel (32) that includes:
        i. an upper layer (34) of glazed heating-tubes (36) each of which has a solar absorptive surface (42) and an upper end (44) that connects directly to and communicates directly with the hot-liquid manifold-tank (26);
   ii. a lower layer (54) of unglazed cooling-tubes (56) each of which has a heat radiating surface (58) and an upper end (62) that connects directly to and communicates directly with the hot-liquid manifold-tank (26), the lower layer (54) of unglazed cooling-tubes (56) being located beneath the upper layer (34) of glazed heating-tubes (36) when the heating-and-cooling collector-array-panel (32) is inclined at an angle facing the sun; and
   iii. parabolic-trough mirror reflectors (64) that are located between the upper layer (34) of glazed heating-tubes (36) and the lower layer (54) of unglazed cooling-tubes (56);
 d. a cold-liquid manifold-tank (92) located below the collector-array-panel (32) that connects directly to and communicates directly with lower ends both of the glazed heating-tubes (36) and of the unglazed cooling-tubes (56);
 e. at least one coaxial heating-and-cooling tube (96) connected directly to and communicating between the cold-liquid manifold-tank (92) and a cold liquid storage tank (98) that is located below the cold-liquid manifold-tank (92),
whereby during day or night rising or sinking air flowing past the heated or cooled parabolic-trough mirror reflectors (64) and the glazed heating-tubes (36) is accelerated through the venturi like openings (68) of each parabolic-trough mirror reflector (64) for blowing around the unglazed cooling-tubes (56) thereby bettering cooling thereof.

11. The solar liquid-heating-and-cooling system (20) of claim 10 wherein the hot-liquid storage-tank (22) includes an air pressure chamber (122) at the top thereof whereby the pressure of air within the air pressure chamber (122) increases due to heating thereof by hot liquid within the hot-liquid storage-tank (22) to thus pressurize the liquid within:
 a. the hot-liquid storage-tank (22);
 b. the hot-liquid manifold-tank (26);
 c. the heating-and-cooling collector-array-panel (32);
 d. the cold-liquid manifold-tank (92); and
 e. the cold liquid storage tank (98),
this pressurizing of the liquid causing liquid to be discharged around at least one of the unglazed cooling-tubes (56) of the heating-and-cooling collector-array-panel (32) whereby evaporation of the discharged liquid further cools the unglazed cooling-tube (56).

12. The solar liquid-heating-and-cooling system (20) of claim 11 wherein the hot-liquid manifold-tank (26) includes a pressure relief expansion valve (132) through which discharged liquid passes and expands into a spray for further cooling the unglazed cooling-tube (56).

13. The solar liquid-heating-and-cooling system (20) of claim 12 wherein the pressure relief expansion valve (132) is adjustable.

14. The solar liquid-heating-and-cooling system (20) of claim 10 wherein an inner return tube (106) included in the at least one coaxial heating-and-cooling tube (24) interconnecting the hot-liquid storage-tank (22) and the a hot-liquid manifold-tank (26) is perforated at a location selected from a group consisting of:
 i. an end of the inner return tube (106); and
 ii. along a length of the inner return tube (106) between the ends thereof.

15. The solar liquid-heating-and-cooling system (20) of claim 10 wherein an inner return tube (106) included in the at least one coaxial heating-and-cooling tube (96) interconnecting the cold-liquid manifold-tank (92) and the cold liquid storage tank (98) is perforated at a location selected from a group consisting of:
 i. an end of the inner return tube (106); and
 ii. along a length of the inner return tube (106) between the ends thereof.

16. The solar liquid-heating-and-cooling system (20) of claim 15 wherein at least one (1) of the unglazed cooling-tubes (56) includes at least two (2) trough-shaped, thermally-connected cooling fins (82), the cooling fins (82):
 a. establishing a slot (84) through which air can flow; and
 b. each cooling fin (82) being adapted for receiving discharged liquid whereby evaporation of liquid from each cooling fin (82) further cools the unglazed cooling-tube (56).

17. The solar liquid-heating-and-cooling system (20) of claim 10 wherein the parabolic-trough mirror reflector (64) is hollow.

18. The solar liquid-heating-and-cooling system (20) of claim 10 wherein the glazed heating-tubes (36) of the upper layer (34) have a coaxial structure.

19. The solar liquid-heating-and-cooling system (20) of claim 10 wherein the unglazed cooling-tubes (56) of the lower layer (54) have a coaxial structure.

20. The solar liquid-heating-and-cooling system (20) of claim 10 wherein the glazed heating-tubes (36) of the upper layer (34) are corrugated.

21. The solar liquid-heating-and-cooling system (20) of claim 10 wherein the unglazed cooling-tubes (56) of the lower layer (54) are corrugated.

22. The solar liquid-heating-and-cooling system (20) of claim 10 wherein surfaces of cooling fins (82) of an installed collector-array-panel (32) that face an interior space of a building are coated with heat absorptive coating.

23. The solar liquid-heating-and-cooling system (20) of claim 10 further comprising drip troughs (148) that are:
 a. located between the cooling fins (82) of an installed collector-array-panel (32) and an interior space of a building; and
 b. adapted for catching condensate that drips from the cooling fins (82).

24. The heating-and-cooling collector-array-panel (32) of any one of claims 1 and 10 wherein at least one unglazed cooling-tube (56) is located beneath at least one glazed heating-tube (36).

25. The heating-and-cooling collector-array-panel (32) of any one of claims 1 and 10 wherein at least one parabolic-trough mirror reflector (64) includes interior edges (66) that form a venturi like opening (68) that is located beneath one of the glazed heating-tubes (36).

26. The heating-and-cooling collector-array-panel (32) of claim 25 wherein at least one venturi like opening (68) is located over one of the unglazed cooling-tubes (56) with the parabolic-trough mirror reflectors (64) shading the unglazed cooling-tubes (56) located beneath the venturi like opening (68) therein.

27. The heating-and-cooling collector-array-panel (32) of any one of claims 1, 2, 5, 7, 10, 16, 19 and 21 wherein at least one of the unglazed cooling-tubes (56) is made of liquid permeable material thereby allowing liquid within the unglazed cooling-tube (56) to pass therethrough for evaporation into atmosphere around the unglazed cooling-tube (56) whereby evaporation of such liquid further cools the unglazed cooling-tube (56).

28. The heating-and-cooling collector-array-panel (32) of claim 27 wherein the liquid permeable material is selected from a group consisting of clay pipe, bamboo pipe, and a semipermeable membrane material.

29. The heating-and-cooling collector-array-panel (32) of claim 28 wherein material of the liquid permeable material is a semipermeable membrane material selected from the group consisting of Gore-Tex™, Sympatex™, Triple-Point Ceramic™, Omni-Tech and H2NO Storm HB.

* * * * *